US012500643B2

(12) United States Patent
Ma et al.

(10) Patent No.: US 12,500,643 B2
(45) Date of Patent: Dec. 16, 2025

(54) TECHNIQUES FOR SELF-AWARENESS BASED INTERFERENCE MEASUREMENT OF SENSING SIGNALS

(71) Applicant: QUALCOMM Incorporated, San Diego, CA (US)

(72) Inventors: Ruifeng Ma, Beijing (CN); Yuwei Ren, Beijing (CN); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 499 days.

(21) Appl. No.: 17/998,144

(22) PCT Filed: Jul. 1, 2020

(86) PCT No.: PCT/CN2020/099637
§ 371 (c)(1),
(2) Date: Nov. 7, 2022

(87) PCT Pub. No.: WO2022/000358
PCT Pub. Date: Jan. 6, 2022

(65) Prior Publication Data
US 2023/0269010 A1 Aug. 24, 2023

(51) Int. Cl.
*H04W 72/04* (2023.01)
*H04B 7/06* (2006.01)
(Continued)

(52) U.S. Cl.
CPC ......... *H04B 7/0632* (2013.01); *H04B 17/345* (2015.01); *H04B 17/347* (2023.05); *H04W 24/08* (2013.01)

(58) Field of Classification Search
CPC .. H04B 17/345; H04B 17/347; H04B 7/0695; H04W 24/08; H04W 72/20
See application file for complete search history.

(56) References Cited

U.S. PATENT DOCUMENTS

2003/0181163 A1\* 9/2003 Ofuji ................... H04W 72/046
455/25
2010/0304680 A1\* 12/2010 Kuffner ................... H04B 7/10
455/77
(Continued)

FOREIGN PATENT DOCUMENTS

CN 109644469 A 4/2019
CN 110637494 A 12/2019

OTHER PUBLICATIONS

International Search Report and Written Opinion—PCT/CN2020/099637—ISA/EPO—Apr. 1, 2021.
(Continued)

*Primary Examiner* — Mahbubul Bar Chowdhury
(74) *Attorney, Agent, or Firm* — Holland & Hart LLP

(57) ABSTRACT

Methods, systems, and devices for wireless communications are described. A first user equipment (UE) may identify a set of interference measurement resources associated with signals received from a second UE. The first UE may perform one or more measurements on one or more signals received from the second UE within the set of interference measurement resources, and determine interference at the second UE associated with sensing signals transmitted by the first UE based on the one or more measurements. The first UE may compare the interference at the second UE to one or more thresholds, each associated with a respective sensing application at the first UE. The first UE may then transmit one or more sensing signals in accordance with respective sets of sensing signal parameters based at least in part on the comparing.

56 Claims, 10 Drawing Sheets

(51) Int. Cl.
  *H04B 17/309* (2015.01)
  *H04B 17/345* (2015.01)
  *H04W 24/08* (2009.01)

(56) References Cited

U.S. PATENT DOCUMENTS

| | | | |
|---|---|---|---|
| 2013/0121186 A1* | 5/2013 | Vajapeyam | H04W 72/542 |
| | | | 370/252 |
| 2016/0174079 A1* | 6/2016 | Wang | H04W 16/14 |
| | | | 455/454 |
| 2016/0174165 A1* | 6/2016 | Ikenaga | H04B 17/318 |
| | | | 455/522 |
| 2017/0118049 A1* | 4/2017 | Miao | H04W 16/10 |
| 2017/0142736 A1* | 5/2017 | Liu | H04W 16/14 |
| 2018/0199373 A1 | 7/2018 | Yang et al. | |
| 2019/0124668 A1* | 4/2019 | Kalhan | H04L 5/0048 |
| 2020/0084774 A1* | 3/2020 | Geirhofer | H04W 8/005 |
| 2020/0112420 A1* | 4/2020 | Xu | H04L 5/0073 |
| 2021/0112503 A1* | 4/2021 | Zhang | H04W 24/08 |
| 2021/0321385 A1* | 10/2021 | Lee | H04B 7/0408 |
| 2024/0349248 A1* | 10/2024 | Lee | H04B 17/318 |

OTHER PUBLICATIONS

ZTE: et al., "Sensing Based Schemes for Cross-Link Interference Mitigation in NR", 3GPP TSG RAN WG1 AH_NR#1 Meeting, R1-1700272, Jan. 20, 2017 (Jan. 20, 2017), 5 Pages, the whole document.

* cited by examiner

TECHNIQUES FOR SELF-AWARENESS BASED INTERFERENCE MEASUREMENT OF SENSING SIGNALS

CROSS REFERENCE

The present Application is a 371 national stage filing of International PCT Application No. PCT/CN2020/099637 by MA et al. entitled "TECHNIQUES FOR SELF-AWARENESS BASED INTERFERENCE MEASUREMENT OF SENSING SIGNALS," filed Jul. 1, 2020, which is assigned to the assignee hereof, and which is expressly incorporated by reference in its entirety herein.

FIELD OF TECHNOLOGY

The following relates generally to wireless communications and more specifically to techniques for self-awareness based interference measurement of sensing signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device (e.g., a user equipment (UE)) may be configured to transmit sensing signals, such as radar sensing signals or millimeter wave (mmW) sensing signals, in order to carry out sensing applications. However, the presence of sensing signals within the communication band may result in interference at other wireless devices. Left unmanaged, interference resulting from sensing signals may result in excessive noise and negatively impact the efficiency and reliability of wireless communications.

SUMMARY

The described techniques relate to improved methods, systems, devices, and apparatuses that support techniques for self-awareness based interference measurement of sensing signals. Generally, the described techniques provide for management of sensing signal interference. In some aspects, a user equipment (UE) (e.g., "sensing" UE) may measure signals received from a potential "victim" UE to estimate interference at the victim UE attributable to sensing signals transmitted by the sensing UE. For example, the sensing UE may receive reference signals, uplink signals, or both, from the victim UE, perform measurements on the received signals, and estimate interference attributable to sensing signals transmitted by the sensing UE based on the received signals. The sensing UE may also receive an indication of an average transmit power associated with signals (e.g., uplink signals, reference signals) received from the victim UE. Using the measurements made by the sensing UE and using the average transmit power, the sensing UE is able to determine a pathloss between the sensing UE and the victim UE. After estimating the pathloss, the sensing UE may determine that the victim UE may experience interference arising from sensing signals. Based on this determination, the sensing UE may adjust its own transmission of sensing signals.

A method of wireless communication at a UE is described. The method may include identifying a set of interference measurement resources associated with signals received from a second UE, performing one or more measurements on one or more signals received from the second UE within the set of interference measurement resources, determining, based on the one or more measurements, interference at the second UE associated with sensing signals transmitted by the first UE, comparing the interference at the second UE to one or more thresholds, each associated with a respective sensing application at the first UE, and transmitting one or more sensing signals in accordance with respective sets of sensing signal parameters based on the comparing.

An apparatus for wireless communication at a UE is described. The apparatus may include a processor, memory coupled with the processor, and instructions stored in the memory. The instructions may be executable by the processor to cause the apparatus to identify a set of interference measurement resources associated with signals received from a second UE, perform one or more measurements on one or more signals received from the second UE within the set of interference measurement resources, determine, based on the one or more measurements, interference at the second UE associated with sensing signals transmitted by the first UE, compare the interference at the second UE to one or more thresholds, each associated with a respective sensing application at the first UE, and transmit one or more sensing signals in accordance with respective sets of sensing signal parameters based on the comparing.

Another apparatus for wireless communication at a UE is described. The apparatus may include means for identifying a set of interference measurement resources associated with signals received from a second UE, performing one or more measurements on one or more signals received from the second UE within the set of interference measurement resources, determining, based on the one or more measurements, interference at the second UE associated with sensing signals transmitted by the first UE, comparing the interference at the second UE to one or more thresholds, each associated with a respective sensing application at the first UE, and transmitting one or more sensing signals in accordance with respective sets of sensing signal parameters based on the comparing.

A non-transitory computer-readable medium storing code for wireless communication at a UE is described. The code may include instructions executable by a processor to identify a set of interference measurement resources associated with signals received from a second UE, perform one or more measurements on one or more signals received from the second UE within the set of interference measurement resources, determine, based on the one or more measurements, interference at the second UE associated with sensing signals transmitted by the first UE, compare the interference at the second UE to one or more thresholds, each associated with a respective sensing application at the first UE, and transmit one or more sensing signals in accordance with respective sets of sensing signal parameters based on the comparing.

Some examples of the method, apparatuses, and non-transitory computer-readable medium described herein may further include operations, features, means, or instructions for receiving, from a base station, a downlink message including an indication of an average transmit power associated with the one or more signals received from the second UE, where determining the interference at the second UE may be based on the average transmit power.

Some examples of the method, apparatuses, and non-transitory computer-readable medium described herein may further include operations, features, means, or instructions for receiving, from a base station, a configuration message including an indication of a set of sensing resources associated with the one or more sensing signals transmitted by the first UE, where transmitting the one or more sensing signals may be based on receiving the configuration message.

Some examples of the method, apparatuses, and non-transitory computer-readable medium described herein may further include operations, features, means, or instructions for identifying the set of interference measurement resources associated with signals received from the second UE based on the set of sensing resources associated with the one or more sensing signals transmitted by the first UE.

Some examples of the method, apparatuses, and non-transitory computer-readable medium described herein may further include operations, features, means, or instructions for determining a first beam direction associated with the one or more signals received from the second UE, and transmitting the one or more sensing signals along a second beam direction based on determining the first beam direction, where the second beam direction may be equivalent to the first beam direction.

Some examples of the method, apparatuses, and non-transitory computer-readable medium described herein may further include operations, features, means, or instructions for determining a relative position of the second UE with respect to the first UE based on determining the interference at the second UE.

In some examples of the method, apparatuses, and non-transitory computer-readable medium described herein, determining the relative position of the second UE with respect to the first UE may include operations, features, means, or instructions for determining a pathloss between the first UE and the second UE, where determining the interference at the second UE may be based on determining the pathloss.

Some examples of the method, apparatuses, and non-transitory computer-readable medium described herein may further include operations, features, means, or instructions for including the second UE and the relative position of the second UE in a first storage object associated with a first sensing application that also includes other UEs and respective other relative positions in relation to the first UE.

Some examples of the method, apparatuses, and non-transitory computer-readable medium described herein may further include operations, features, means, or instructions for determining, based on the first storage object, that a UE included within the first storage object may be within a range of the one or more sensing signals associated with the first sensing application, and selectively adjusting a first set of sensing signal parameters associated with the first sensing application based on determining a UE included within the first storage object may be within the range of the sensing signals associated with the first sensing application.

Some examples of the method, apparatuses, and non-transitory computer-readable medium described herein may further include operations, features, means, or instructions for selectively decreasing a transmit power of the first sensing application based on a quantity of UEs in the first storage object exceeding a threshold, and selectively increasing a transmit power of the first sensing application based on the quantity of UEs in the first storage object being less than the threshold.

Some examples of the method, apparatuses, and non-transitory computer-readable medium described herein may further include operations, features, means, or instructions for including the second UE and the relative position of the second UE in a second storage object associated with a second sensing application different from the first sensing application, where the second storage object also includes other UEs and respective other relative positions in relation to the first UE.

In some examples of the method, apparatuses, and non-transitory computer-readable medium described herein, the one or more signals received from the second UE include an uplink signal, a reference signal, or both.

In some examples of the method, apparatuses, and non-transitory computer-readable medium described herein, the first set of sensing signal parameters include a transmit power associated with the one or more sensing signals.

In some examples of the method, apparatuses, and non-transitory computer-readable medium described herein, the one or more measurements include a received signal strength indicator (RSSI) measurement, a reference signal received power (RSRP) measurement, or both.

DETAILED DESCRIPTION

In some wireless communications systems, a wireless device (e.g., a user equipment (UE)) may be configured to transmit sensing signals, such as radar sensing signals or millimeter wave (mmW) sensing signals, in order to carry out sensing applications. Sensing applications may be used to identify hand gestures, three-dimensional imaging, virtual reality imaging, beam tracking, distance determinations, and the like. In some cases, a UE may be able to transmit both data transmission signals (e.g., uplink signals, sidelink signals) and sensing signals within a communication band associated with the UE. However, the presence of sensing signals within the communication band may result in interference at other wireless devices. For example, a first UE (e.g., "sensing" UE) which transmits sensing signals may cause interference with communications at a second UE (e.g., "victim" UE). Left unmanaged, interference resulting from sensing signals may result in excessive noise and negatively impact the efficiency and reliability of wireless communications.

To address interference issues associated with sensing signals transmitted by sensing UEs, techniques for management of sensing signal interference are described. Generally, the described techniques provide for management of sensing signal interference. In some aspects, a "sensing" UE may measure signals received from a potential "victim" UE to estimate interference at the victim UE attributable to sensing signals transmitted by the sensing UE. For example, the sensing UE may receive reference signals, uplink signals, or both, from the victim UE, perform measurements on the received signals, and estimate interference attributable to sensing signals transmitted by the sensing UE based on the received signals. The sensing UE may also receive an indication of an average transmit power associated with signals (e.g., uplink signals, reference signals) received from the victim UE. Using the measurements made by the sensing UE and using the average transmit power, the sensing UE is able to determine a pathloss between the sensing UE and the victim UE. After estimating the pathloss, the sensing UE may determine that the victim UE may experience interference arising from sensing signals. Based on this determination, the sensing UE may adjust its own transmission of sensing signals to address estimated interference experience by the victim UE.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for self-awareness based interference measurement of sensing signals.

Figure 1:
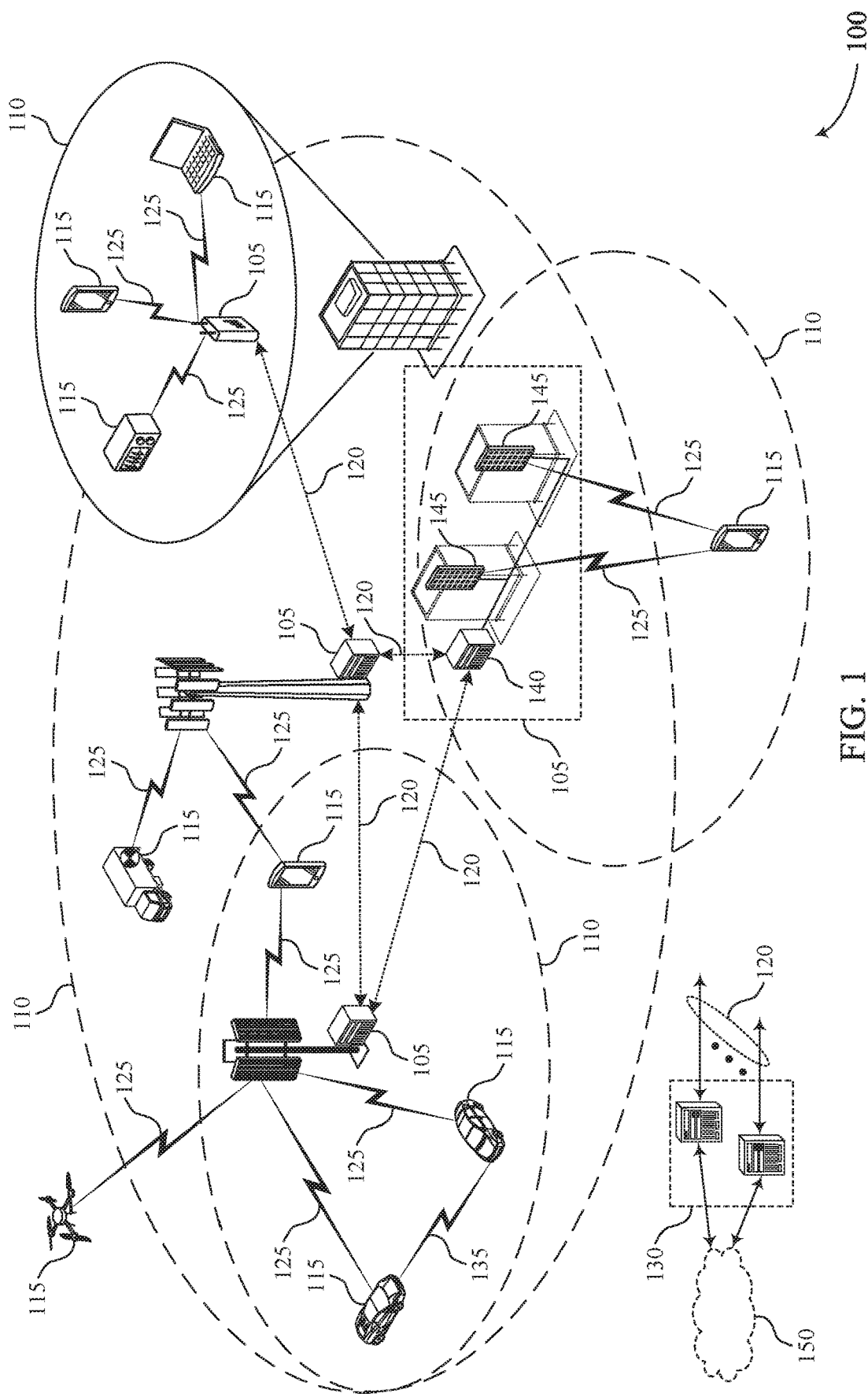
FIG. 1 illustrates an example of a wireless communications system that supports techniques for self-awareness based interference measurement of sensing signals in accordance with aspects of the present disclosure.

FIG. 1 illustrates an example of a wireless communications system 100 that supports techniques for self-awareness based interference measurement of sensing signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As noted previously herein, some UEs 115 may be able to transmit both data transmission signals (e.g., uplink signals, sidelink signals) and sensing signals within a communication band associated with the UEs 115. However, the presence of sensing signals within the communication band may result in interference at other wireless devices. For example, a first UE 115 (e.g., "sensing" UE 115) which transmits sensing signals may cause interference with communications at a second UE 115 (e.g., "victim" UE 115). Left unmanaged, interference resulting from sensing signals may result in excessive noise and negatively impact the efficiency and reliability of wireless communications.

Accordingly, the UEs 115 and the base stations 105 of the wireless communications system 100 may support techniques for management of sensing signal interference. In particular, techniques described herein may enable a sensing UE 115 to estimate interference at other potential victim UEs 115 which is attributable to sensing signals transmitted by the sensing UE 115. Based on estimated interference experienced by potential victim UEs 115, the sensing UE 115 may adjust a set of sensing signal parameters associated with sensing signal applications of the sensing UE 115 to address the estimated interference.

For example, a base station 105 of the wireless communications system 100 may determine interference measurement resources to be used by a sensing UE 115 to estimate interference at the victim UE 115 which is attributable to sensing signals transmitted by the sensing UE 115. The base station 105 may transmit a configuration message to the sensing UE 115, where the configuration message includes an indication of the interference measurement resources to be used by the sensing UE 115. The base station 105 may additionally transmit a downlink message to the sensing UE 115, where the downlink message includes an indication of an average transmit power used by the victim UE 115 in transmitting signals which will be received by the sensing UE 115. Subsequently, the sensing UE 115 may receive signals (e.g., reference signals, uplink signals, or both), from the victim UE 115, and perform measurements on the received signals. The sensing UE 115 may estimate interference experienced at the victim UE 115 interference attributable to sensing signals transmitted by the sensing UE 115 based on the signals (e.g., reference signals, uplink signals) received from the victim UE 115, the indication of the average transmit power, or both. For instance, the sensing UE 115 may determine a pathloss between the sensing UE 115 and the victim UE 115 based on the measurements made by the sensing UE 115 and the average transmit power. After estimating the pathloss, the sensing UE 115 may determine that the victim UE may experience interference arising from sensing signals. Based on this determination, the sensing UE 115 may selectively adjust a set of sensing parameters (e.g., transmit power, transmit beam) associated with sensing signals in order to address estimated interference experience by the victim UE 115.

In some aspects, the sensing UE 115 may be configured to perform one or more sensing applications. For example, a first sensing application may be associated with identifying hand gestures of a user, and a second sensing application may be associated with longer-range virtual reality imaging. Different sensing applications may be associated with different sets of sensing signal parameters, and may therefore result in varying levels of interference at potential victim UEs 115. In this regard, the sensing UE 115 may be configured to estimate interference attributable to sensing signals associated with each sensing application. Moreover, the sensing UE 115 may generate storage objects associated with each sensing application. In some aspects, the sensing UE 115 may store relative positions of victim UEs 115 and estimated interference at the victim UEs 115 within the storage objects in order to facilitate determination of interference attributable to each sensing application.

Techniques described herein may enable sensing UEs 115 to estimate interference attributable to sensing signals transmitted by the sensing UE 115, and adjust parameters associated with the sensing signals to reduce interference attributable to the sensing signals. Accordingly, techniques described herein may facilitate the use of sensing applications while reducing interference attributable to the sensing applications, thereby improving the efficiency and reliability of wireless communications within the wireless communications system 100.

Figure 2:
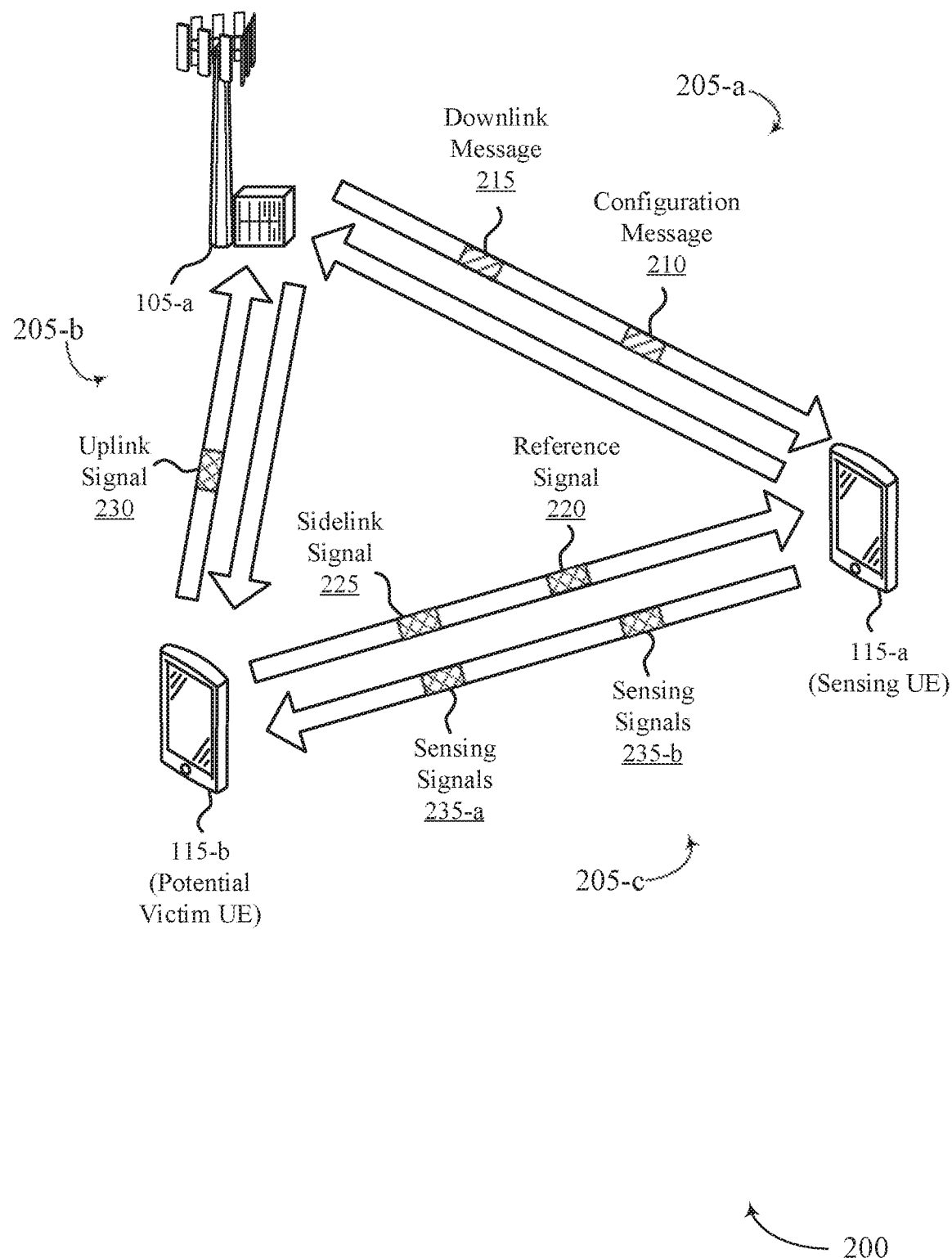
FIG. 2 illustrates an example of a wireless communications system that supports techniques for self-awareness based interference measurement of sensing signals in accordance with aspects of the present disclosure.

FIG. 2 illustrates an example of a wireless communications system 200 that supports techniques for self-awareness based interference measurement of sensing signals in accordance with aspects of the present disclosure. In some examples, wireless communications system 200 may implement aspects of wireless communications system 100. The wireless communications system 200 may include a first UE 115-*a*, a second UE 115-*b*, and a base station 105-*a*, which may be examples of UEs 115 and base stations 105, as described with reference to FIG. 1. In particular, the first UE 115-*a* may include an example of a "sensing" UE 115-*a*, and the second UE 115-*b* may include an example of a "victim" UE 115-*b*, as described previously herein.

The first UE 115-*a* and the second UE 115-*b* may communicate with the base station 105-*a* using a communication link 205-*a* and a communication link 205-*b*, respectively, which may be examples of NR or LTE links between the first UE 115-*a* and the second UE 115-*b*, respectively, and the base station 105-*a*. In some cases, the communication link 205-*a* and the communication link 205-*b* may include examples of access links (e.g., Uu links). The communication link 205-*a* and communication link 205-*b* may include bi-directional links that enable both uplink and downlink communication. For example, the first UE 115-*a* may transmit uplink signals, such as uplink control signals or uplink data signals, to the base station 105-*a* using the first communication link 205-*a* and the base station 105-*a* may transmit downlink signals, such as downlink control signals or downlink data signals, to the first UE 115-*a* using the communication link 205-*a*. By way of another example, the second UE 115-*b* may transmit uplink signals, such as uplink control signals or uplink data signals, to the base station 105-*a* using the first communication link 205-*b* and the base station 105 may transmit downlink signals, such as downlink control signals or downlink data signals, to the second UE 115-*b* using the communication link 205-*b*. The first UE 115-*a* and the second UE 115-*b* may communicate with one another via a communication link 205-*c*. In some cases, the communication link 205-*c* may include an example of a link between two UEs 115 (e.g., a sidelink communication link, or PC5 link).

The wireless communications system 100 may support techniques for management of sensing signal interference. In particular, techniques described herein may enable the first UE 115-*a* to estimate interference at other the second UE 115-*b* which is attributable to sensing signals transmitted by the first UE 115-*a*. Based on estimated interference experienced by the second UE 115-*b*, the first UE 115-*a* may adjust a set of sensing signal parameters associated with sensing signal applications of the first UE 115-*a* to address the estimated interference.

For example, the base station 105-*a* of the wireless communications system 200 may determine (e.g., configure) a set of interference measurement resources, a set of sensing resources, or both. In some aspects, the set of sensing resources may include a set of time and frequency resources to be used by the first UE 115-*a* to transmit sensing signals 235 associated with one or more sensing applications supported by the first UE 115-*a*. The set of interference measurement resources may be associated with signals (e.g., uplink signals, reference signals, sidelink signals) transmitted by the second UE 115-*b*. In this regard, the set of interference measurement signals may be used by the first UE 115-*a* to measure signals received from the second UE 115-*b*

The base station 105-*a* may transmit a configuration message 210 to the first UE 115-*a*, where the configuration message 210 includes an indication of the set of sensing resources, the set of interference measurement resources, or both. For example, the configuration message 210 may include an indication of the set of sensing resources associated with sensing signals 235 transmitted by the first UE 115-*a*. In some aspects, the configuration message 210 may additionally include an indication of a type of signal (e.g., reference signals 220, sidelink signals 225, uplink signals 230) which the first UE 115-*a* is to receive and measure from the second UE 115-*b*.

In some aspects, the base station 105-*a* may transmit a downlink message 215 (e.g., control message, configuration message) to the first UE 115-*a*, where the downlink message 215 includes an indication of one or more parameters associated with the signals transmitted by the second UE 115-*b*. The one or more parameters associated with the signals transmitted by the second UE 115-*b* may include an average transmit power. For example, in cases where the first UE 115-*a* is configured to receive and measure reference signals 220 transmitted by the second UE 115-*b*, the downlink message 215 may include an indication of an average transmit power associated with the reference signals 220. By way of another example, in cases where the first UE 115-*a* is configured to receive and measure uplink signals 230 transmitted by the second UE 115-*b*, the downlink message 215 may include an indication of an average transmit power associated with the uplink signals 230.

In some aspects, the first UE 115-*a* may identify the set of interference measurement resources associated with signals received from the second UE 115-*b*. In some aspects, the first UE 115-*b* may identify the set of interference measurement resources based on the configuration message 210, the downlink message 215, or both. For example, in cases where the configuration message 210 includes an indication of the set of sensing resources associated with sensing signals 235 transmitted by the first UE 115-*a*, the first UE 115-*a* may determine the set of interference measurement resources based on the indication of the set of sensing resources.

Additionally or alternatively, the first UE 115-*a* may determine the set of interference measurement resources and/or the set of sensing signal resources associated with sensing signals 235 of a sensing application on its own (e.g., without signaling from the base station 105-*a*). For example, in some cases, the first UE 115-*a* may select the set of sensing signal resources for transmitting sensing signals 235, and may determine the set of interference measurement resources based on the sensing signal resources. In such cases, the first UE 115-*a* may transmit an uplink message to the base station 105-*a*, where the uplink message includes an indication of the set of sensing resources associated with the sensing signals 235.

The first UE 115-*a* may receive one or more signals from the second UE 115-*a*. The one or more signals received from the second UE 115-*b* may include reference signals 220, sidelink signals 225, uplink signals 230, or any combination thereof. In some aspects, the first UE 115-*a* may receive the signals from the second UE 115-*b* based on the configuration message 210, the downlink message 215, identifying the set of interference measurement resources, or any combination thereof. For example, in some cases, the set of interference measurement resources may be associated with uplink signals 230 transmitted from the second UE 115-*b* to the base station 105-*a*. In this example, the first UE 115-*a* may receive the uplink signals 230 transmitted by the second UE 115-*b* by "listening in" or "intercepting" the uplink signals 230 according to the set of interference measurement resources.

In some aspects, the signals received from the second UE 115-*b* may be received within the set of interference measurement resources. For example, the set of interference measurement resources may include a set of time resources and a set of frequency resources. In this regard, the signals received from the second UE 115-*b* may be received within the set of time resources and the set of interference resources associated with the set of interference measurement resources.

In some aspects, the first UE 115-*a* may perform one or more measurements on the signals (e.g., reference signals 220, sidelink signals 225, uplink signals 230) received form the second UE 115-*b*. The one or more measurements may include, but are not limited to, received signal strength indicator (RSSI) measurements, reference signal received power (RSRP) measurements, reference signal received quality (RSRQ) measurements, signal-to-noise ratio (SNR) measurements, signal-to-interference-plus-noise ratio (SINR) measurements, or any combination thereof.

In some cases, the first UE 115-*b* may determine a beam direction associated with the signals (e.g., reference signals 220, sidelink signals 225, uplink signals 230) received from the second UE 115-*b*. In this regard, the first UE 115-*a* may determine an angle or other orientation by which the signals (e.g., reference signals 220, sidelink signals 225, uplink signals 230) are received from the second UE 115-*b*. In some aspects, the first UE 115-*a* may determine the beam direction associated with the signals received from the second UE 115-*b* based on the measurements performed on the received signals. For example, the first UE 115-*a* may perform measurements on the signals received from the second UE 115-*b* at various antenna elements or antenna arrays of the first UE 115-*a*, and may determine (e.g., estimate) the beam direction of the received signals based on the measurements.

In some aspects, the first UE 115-*a* may determine (e.g., estimate) interference at the second UE 115-*b* associated with sensing signals 235 transmitted by the first UE 115-*a*. In some aspects, the first UE 115-*a* may determine the interference at the second UE 115-*a* based on receiving the signals (e.g., reference signals 220, sidelink signals 225, uplink signals 230) from the second UE 115-*b*, measurements performed on received signals, a beam direction of received signals, or any combination thereof. Additionally or alternatively, the first UE 115-*a* may determine the interference at the second UE 115-*b* based on the average transmit power of the signals received from the second UE 115-*b*, as indicated in the downlink message 215.

Furthermore, the first UE 115-*a* may determine (e.g., estimate) interference at the second UE 115-*b* which is attributable to sensing signals 235 transmitted by the first UE 115-*a* based on a set of sensing signal parameters (e.g., transmit power, transmit beam direction) associated with the sensing signals of various sensing applications. In this regard, the first UE 115-*a* may determine interference at the second UE 115-*b* which is attributable to different sensing applications carried out by the first UE 115-*a*. For example, the first UE 115-*a* may be configured to perform a first sensing application associated with determining hand gestures with a first set of sensing signals 235-*a*, and a second sensing application associated with virtual reality imaging with a second set of sensing signals 235-*b*. In this example, the first UE 115-*a* may determine (e.g., estimate) a first interference at the second UE 115-*b* which is attributable to the first set of sensing signals 235-*a* associated with the first sensing application, and may determine (e.g., estimate) a second interference at the second UE 115-*b* which is attributable to the second set of sensing signals 235-*b* associated with the second sensing application.

In some aspects, the first UE 115-*a* may compare the interference at the second UE 115-*b* which is attributable to sensing signals 235 transmitted by the first UE 115-*a* with one or more thresholds. In some aspects, the one or more thresholds may be associated with one or more sensing applications at the first UE 115-*a*. For example, in cases where the first UE 115-*a* is configured to perform a first sensing application with a first set of sensing signals 235-*a* and a second sensing application with a second set of sensing signals 235-*b*, the first sensing application may be associated with a first threshold, and the second sensing application may be associated with a second threshold. In this example, the first UE 115-*a* may compare the first interference attributable to the first set of sensing signals 235-*a* of the first sensing application to the first threshold, and may compare the second interference attributable to second set of sensing signals 235-*b* of the second sensing application to the second threshold.

In some cases, the first UE 115-*a* may determine a relative position of the second UE 115-*b* with respect to the first UE 115-*a*. In some aspects, the first UE 115-*a* may determine the relative position of the second UE 115-*b* with respect to the first UE 115-*a* based on performing the measurements on signals received from the second UE 115-*b*, determining a beam direction of signals received from the second UE 115-*b*, determining the interference at the second UE 115-*b*, or any combination thereof. In some cases, the first UE 115-*a* may determine a relative position of the second UE 115-*b* based on a determined position of the first UE 115-*a*, an indication of a position of the second UE 115-*b* signaled by the second UE 115-*b* or the base station 105-*a*, or any combination thereof. In some cases, determining the relative position of the second UE 115-*b* may include determining a relative distance between the first UE 115-*a* and the second UE 115-*b*, an orientation (e.g., angle) between the first UE 115-*a* and the second UE 115-*b*, or both.

In some aspects, determining the relative position of the second UE 115-*a* with respect to the first UE 115-*a* may include determining a pathloss (e.g., path attenuation) between the first UE 115-*a* and the second UE 115-*b*. For example, the first UE 115-*a* may estimate a distance (e.g., relative position) between the first UE 115-*a* and the second UE 115-*b*, and may determine (e.g., estimate) a pathloss between the first UE 115-*a* and the second UE 115-*b* based on the estimated pathloss. In some aspects, the first UE 115-*a* may determine a pathloss between the first UE 115-*a* and the second UE 115-*b* for each sensing application at the first UE 115-*a*. For example, the first UE 115-*a* may be configured to perform a first sensing application using a first set of sensing signals 235-*a* associated with a first set of sensing parameters, and a second sensing application using a second set of sensing signals 235-*b* associated with a second set of sensing parameters. In this example, the first UE 115-*a* may determine a first pathloss associated with the first sensing application based on the relative position of the second UE 115-*b*, the first set of sensing signal parameters associated with the first set of sensing signals 235-*a*, or both. Similarly, the first UE 115-*a* may determine a second pathloss associated with the second sensing application based on the relative position of the second UE 115-*b*, the second set of sensing signal parameters associated with the second set of sensing signals 235-*b*, or both. In some aspects, the first UE 115-*a* may be configured to determine and/or refine estimated interference at the second UE 115-*b* based on the determined pathloss.

In some aspects, the first UE 115-*a* may include the relative position of the second UE 115-*b* in storage objects associated with various sensing applications supported by the first UE 115-*a*. For example, the first UE 115-*a* may include the relative position of the second UE 115-*b* in a first storage object associated with a first sensing application, and in a second storage object associated with a second sensing application. The storage objects may include any storage object known in the art including, but not limited to, a table, an index, a map, and the like. In some aspects, the first storage object and the second storage object may each additionally include other UEs 115 and respective other relative positions of the other UEs 115 with respect to the first UE 115-*a*. For example, the first storage object associated with the first sensing application may include a third UE 115 (not shown) and a relative position of the third UE 115 with respect to the first UE 115-*a*.

In some aspects, the first UE 115-*a* may be configured to estimate interference and/or ranges of potential interference associated with each respective sensing application based on the storage objects associated with each respective sensing application, sets of parameters associated with sensing signals 235 associated with each sensing application, or both. For example, the first UE 115-*a* may determine, based on the first storage object associated with the first sensing application, that a UE 115 (e.g., the second UE 115-*b*) included within the first storage object is within a range of a first set of sensing signals 235-*a* associated with the first sensing application. By way of another example, the first UE 115-*a* may determine, based on the second storage object associated with the second sensing application, that a UE 115 (e.g., the second UE 115-*b*) included within the second storage object is within a range of the second set of sensing signals 235-*b* associated with the second sensing application.

In some cases, the first UE 115-*a* may selectively adjust parameters associated with the respective sensing applications (e.g., first sensing application, second sensing application) based on determining a UE 115 included in a respective storage objects is within range of the sensing signals 235 associated with the respective sensing application. For example, as noted previously herein, the first UE 115-*a* may determine, based on the first storage object associated with the first sensing application, that a UE 115 (e.g., the second UE 115-*b*) included within the first storage object is within a range of the first set of sensing signals 235-*a* associated with the first sensing application. In this example, the first UE 115-*a* may selectively adjust a first set of sensing signal parameters associated with the first set of sensing signals 235-*a* of the first sensing application based on determining that a UE 115 included within the first storage object is within the range of the first set of sensing signals 235-*a*. Sensing signal parameters which may be selectively adjusted may include, but are not limited to, a set of time resources for transmitting sensing signals 235, a set of frequency resources for transmitting sensing signals 235, a transmit power for transmitting sensing signals 235, a beam direction for transmitting sensing signals 235, and the like.

Additionally or alternatively, the first UE 115-*a* may selectively adjust parameters associated with the respective sensing applications (e.g., first sensing application, second sensing application) based on a quantity of UEs 115 which are within range of the sensing signals 235 associated with a respective sensing application. For example, the first UE 115-*a* may determine, based on the first storage object associated with the first sensing application, a quantity of UEs 115 included within the first storage object which are within a range of the first set of sensing signals 235-*a* associated with the first sensing application. In this example, the first UE 115-*a* may selectively decrease a transmit power of the first set of sensing signals 235-*a* associated with the first sensing application based on the quantity of UEs 115 which are within range and/or within the storage object exceeding a threshold. Conversely, the first UE 115-*a* may selectively increase a transmit power of the first set of sensing signals 235-*a* associated with the first sensing application based on the quantity of UEs 115 which are within range and/or within the storage object being less than the threshold.

In some aspects, the first UE 115-*a* may transmit one or more sensing signals 235. In some cases, the first UE 115-*a* may transmit the one or more sensing signals 235 to the second UE 115-*a*. In some aspects, the first UE 115-*c* may transmit the one or more sets of sensing signals 235 (e.g., first set of sensing signals 235-*a*, second set of sensing signals 235-*b*) based on (e.g., in accordance with) respective sets of sensing signal parameters associated with respective sensing applications supported by the first UE 115-*a*. Sensing signal parameters may include a transmit power of sensing signals 235, a transmit direction (e.g., transmit beam) of sensing signals 235, and the like. In some aspects, the first UE 115-*a* may transmit the one or more sets of sensing signals 235 based on the configuration message received 210, receiving the signals from the second UE 115-*b*, performing the measurements on the received signals, the beam direction of the received signals, the interference at the second UE 115-*b*, the relative position of the second UE 115-*b*, or any combination thereof.

In some aspects, the first UE 115-*a* may transmit the one or more sensing signals 235 based on comparing the interference at the second UE 115-*b* with one or more thresholds. For example, the first UE 115-*a* may compare determined interference at the second UE 115-*b* with a threshold associated with a first sensing application, and may transmit the first set of sensing signals 235-*a* associated with the first sensing application based on the comparison. Similarly, by way of another example, the first UE 115-*a* may compare determined interference at the second UE 115-*b* with a threshold associated with a second sensing application, and may transmit the second set of sensing signals 235-*b* associated with the second sensing application based on the comparison.

Additionally or alternatively, the first UE 115-*a* may transmit the one or more sensing signals 235 based on determining the beam direction of signals received from the second UE 115-*b*. For example, the first UE 115-*a* may determine that the signals (e.g., reference signals 220, sidelink signals 225, uplink signals 230) transmitted by the second UE 115-*b* are associated with (e.g., were received along) a first beam direction. In this example, the first UE 115-*a* may transmit the first set of sensing signals 235-*a*, the second set of sensing signals 235-*b*, or both, along a second beam direction, where the second beam direction is similar and/or equivalent to the first beam direction. By transmitting the sensing signals 235 along a similar (e.g., equivalent) beam direction as that by which the signals from the second UE 115-*b* were received, techniques described herein may enable more accurate determinations (e.g., estimations) of interference attributable to sensing signals 235, and may allow for more efficient management of sensing signal 235 interference.

Techniques described herein may enable the sensing UE 115-*a* to estimate interference attributable to sensing signals transmitted by the sensing UE 115-*a*, and adjust parameters associated with the sensing signals to reduce interference attributable to the sensing signals. Accordingly, techniques described herein may facilitate the use of sensing applications while reducing interference attributable to the sensing applications, thereby improving the efficiency and reliability of wireless communications within the wireless communications system 200.

Figure 3:
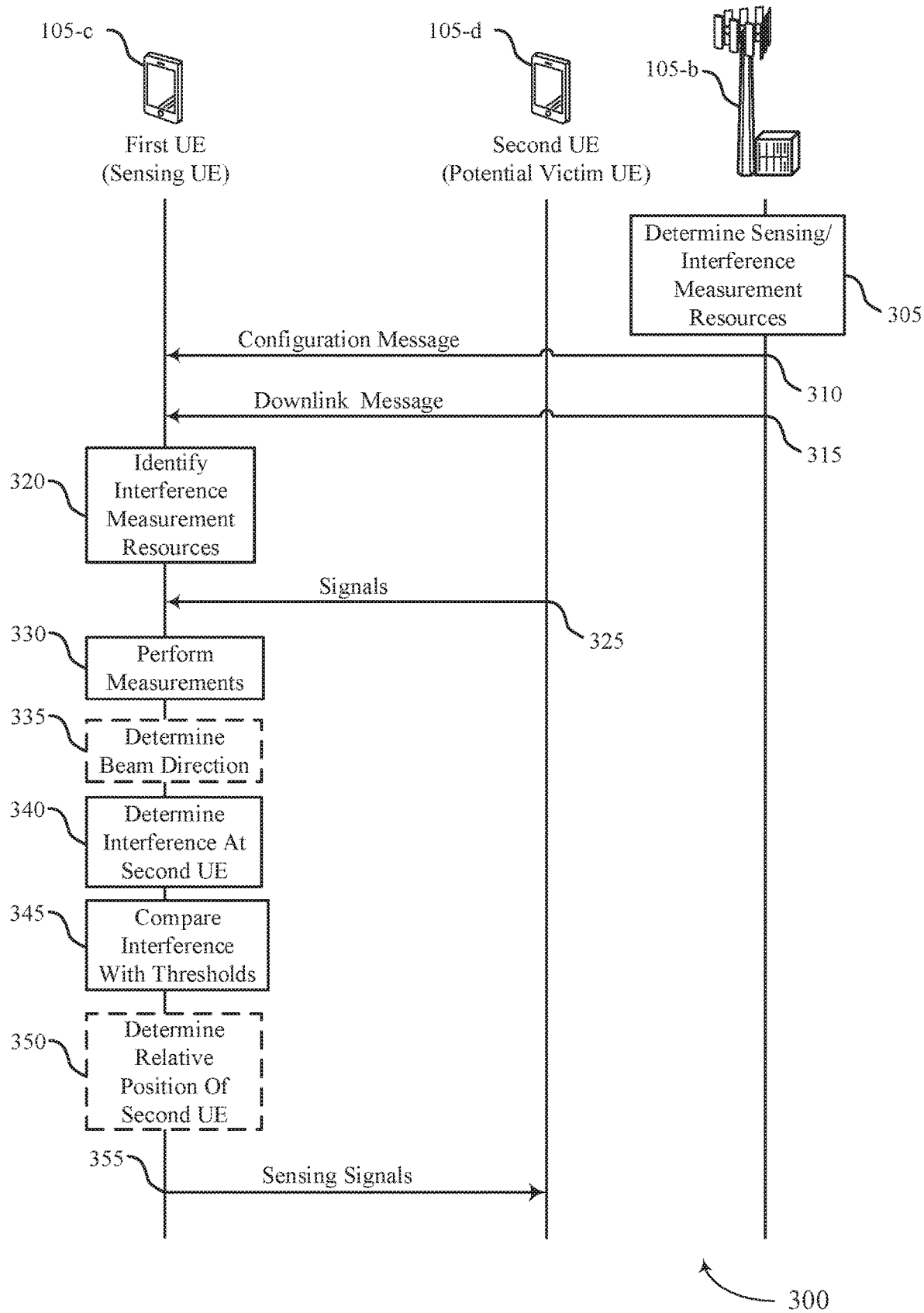
FIG. 3 illustrates an example of a process flow that supports techniques for self-awareness based interference measurement of sensing signals in accordance with aspects of the present disclosure.

FIG. 3 illustrates an example of a process flow 300 that supports techniques for self-awareness based interference measurement of sensing signals in accordance with aspects of the present disclosure. In some examples, process flow 300 may implement, or be implemented by, aspects of wireless communications system 100 or 200. For example, the process flow 300 may illustrate identifying a set of interference measurement resources, identifying interference experienced at a victim UE 115, and transmitting sensing signals based on the determined interference, as described with reference to FIGS. 1-2.

In some cases, process flow 300 may include a first UE 115-*c*, a second UE 115-*d*, and a base station 105-*b* which may be examples of corresponding devices as described herein. The first UE 115-*c* and the second UE 115-*d* illustrated in FIG. 3 may be examples of the first UE 115-*a* and the second UE 115-*b*, respectively, illustrated in FIG. 2. In this regard, the first UE 115-*c* may include an example of a "sensing" UE 115-*c*, and the second UE 115-*d* may include an example of a "victim" UE 115-*d*. Similarly, the base station 105-*b* illustrated in FIG. 3 may be an example of the base station 105-*a* illustrated in FIG. 2. In some aspects, the first UE 115-*c* and the second UE 115-*d* may communicate over a sidelink communication link, such as the communication link 205-*c* illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the base station 105-*b* may determine (e.g., configure) a set of interference measurement resources, a set of sensing resources, or both. In some aspects, the set of sensing resources may include a set of time and frequency resources to be used by the first UE 115-*c* to transmit sensing signals associated with one or more sensing applications. The set of interference measurement resources may be associated with signals (e.g., uplink signals, reference signals, sidelink signals) transmitted by the second UE 115-*d*. In this regard, the set of interference measurement signals may be used by a first UE 115-*c* to measure signals received from the second UE 115-*d*.

At 310, the base station 105-*b* may transmit a configuration message to the first UE 115-*c*, where the configuration message includes an indication of the set of sensing resources, the set of interference measurement resources, or both. For example, the configuration message may include an indication of the set of sensing resources associated with sensing signals transmitted by the first UE 115-*c*. In some aspects, the configuration message may additionally include an indication of a type of signal (e.g., uplink signal, reference signal, sidelink signal) which the first UE 115-*c* is to receive and measure from the second UE 115-*d*.

At 315, the base station 105-*b* may transmit a downlink message to the first UE 115-*c*, where the downlink message includes an indication of one or more parameters associated with the signals transmitted by the second UE 115-*d*. The one or more parameters associated with the signals transmitted by the second UE 115-*d* may include an average transmit power. For example, in cases where the first UE 115-*c* is configured to receive and measure reference signals transmitted by the second UE 115-*d*, the downlink message may include an indication of an average transmit power associated with the reference signals. By way of another example, in cases where the first UE 115-*c* is configured to receive and measure uplink signals transmitted by the second UE 115-*d*, the downlink message may include an indication of an average transmit power associated with the uplink signals.

At 320, the first UE 115-*c* may identify the set of interference measurement resources associated with signals received from the second UE 115-*d*. In some aspects, the first UE 115-*c* may identify the set of interference measurement resources at 320 based on the configuration message received at 310, the downlink message received at 315, or both. For example, in cases where the configuration message transmitted at 310 includes an indication of the set of sensing resources associated with sensing signals transmitted by the first UE 115-*c*, the first UE 115-*c* may determine the set of interference measurement resources at 320 based on the indication of the set of sensing resources.

Additionally or alternatively, the first UE 115-*c* may determine the set of interference measurement resources and/or the set of sensing signal resources associated with sensing signals of a sensing application on its own (e.g., without signaling from the base station 105-*b*). For example, in some cases, the first UE 115-*c* may select the set of sensing signal resources for transmitting sensing signals, and may determine the set of interference measurement resources at 320 based on the sensing signal resources. In such cases, the first UE 115-*c* may determine the set of interference measurement resources based on the set of sensing resources associated with the sensing signals. Additionally, in cases where the first UE 115-*c* determines its own set of sensing resources, the UE 115-*c* may transmit an uplink message to the base station 105-*b*, where the uplink message includes an indication of the set of sensing resources associated with the sensing signals.

At 325, the first UE 115-*c* may receive one or more signals from the second UE 115-*d*. In some aspects, the signals received from the second UE 115-*d* at 325 may be received within the set of interference measurement resources identified at 320. For example, the set of interference measurement resources may include a set of time resources and a set of frequency resources. In this regard, the signals received at 325 may be received within the set of time resources and the set of interference resources associated with the set of interference measurement resources.

The one or more signals received at 325 may include uplink signals, reference signals, sidelink signals, or any combination thereof. In some aspects, the first UE 115-*c* may receive the signals from the second UE 115-*d* at 325 based on the configuration message received at 310, the downlink message received at 315, identifying the set of interference measurement resources at 320, or any combination thereof. For example, in some cases, the set of interference measurement resources may be associated with uplink signals transmitted from the second UE 115-*d* to the base station 105-*b*. In this example, the first UE 115-*c* may receive the uplink signals transmitted by the second UE 115-*d* by "listening in" or "intercepting" the uplink signals according to the set of interference measurement resources.

At 330, the first UE 115-*c* may perform one or more measurements on the signals received form the second UE 115-*d*. The one or more measurements may include, but are not limited to, RSSI measurements, RSRP measurements, RSRQ measurements, SNR measurements, SINR measurements, or any combination thereof.

At 335, the first UE 115-*c* may determine a beam direction associated with the signals received from the second UE 115-*d*. In this regard, the first UE 115-*c* may determine an angle or other orientation by which the signals (e.g., uplink signals, reference signals, sidelink signals) are received from the second UE 115-*d*. In some aspects, the first UE 115-*c* may determine the beam direction associated with the signals received from the second UE 115-*d* based on the measurements performed at 330. For example, the first UE 115-*c* may perform measurements on the signals received at 325 at various antenna elements or antenna arrays of the first UE 115-*c*, and may determine (e.g., estimate) the beam direction of the received signals based on the measurements.

At 340, the first UE 115-*c* may determine (e.g., estimate) interference at the second UE 115-*d* associated with sensing signals transmitted by the first UE 115-*c*. In some aspects, the first UE 115-*c* may determine the interference at the second UE 115-*d* based on receiving the signals from the second UE 115-*d* at 325, performing the measurements at 330, determining the beam direction at 335, or any combination thereof. Additionally or alternatively, the first UE 115-*c* may determine the interference at the second UE 115-*d* based on the average transmit power of the signals received from the second UE 115-*d*, as indicated in the downlink message.

Furthermore, the first UE 115-*c* may determine (e.g., estimate) interference at the second UE 115-*d* which is attributable to sensing signals transmitted by the first UE 115-*c* based on a set of sensing signal parameters (e.g., transmit power, transmit beam direction) associated with the sensing signals of various sensing applications. In this regard, the UE 115-*c* may determine interference at the second UE 115-*d* which is attributable to different sensing applications carried out by the first UE 115-*c*. For example, the first UE 115-*c* may be configured to perform a first sensing application associated with determining hand gestures, and a second sensing application associated with virtual reality imaging. In this example, the first UE 115-*c* may determine (e.g., estimate) a first interference at the second UE 115-*d* which is attributable to sensing signals associated with the first sensing application, and may determine (e.g., estimate) a second interference at the second UE 115-*d* which is attributable to sensing signals associated with the second sensing application.

At 345, the first UE 115-*c* may compare the interference at the second UE 115-*d* determined at 340 with one or more thresholds. In some aspects, the one or more thresholds may be associated with one or more sensing applications at the first UE 115-*c*. For example, in cases where the first UE 115-*c* is configured to perform a first sensing application and a second sensing application, the first sensing application may be associated with a first threshold, and the second sensing application may be associated with a second threshold. In this example, the first UE 115-*a* may compare the first interference attributable to sensing signals of the first sensing application to the first threshold, and may compare the second interference attributable to sensing signals of the second sensing application to the second threshold.

At 350, the first UE 115-*c* may determine a relative position of the second UE 115-*d* with respect to the first UE 115-*c*. In some aspects, the first UE 115-*c* may determine the relative position of the second UE 115-*d* with respect to the first UE 115-*c* based on performing the measurements at 330, determining the beam direction at 335, determining the interference at the second UE 115-*d* at 340, or any combination thereof. In some cases, the first UE 115-*c* may determine a relative position of the second UE 115-*d* based on a determined position of the first UE 115-*c*, an indication of a position of the second UE 115-*d* signaled by the second UE 115-*d* or the base station 105-*c*, or any combination thereof. In some cases, determining the relative position of the second UE 115-*d* may include determining a relative distance between the first UE 115-*c* and the second UE 115-*d*, an orientation (e.g., angle) between the first UE 115-*c* and the second UE 115-*d*, or both.

In some aspects, determining the relative position of the second UE 115-*d* with respect to the first UE 115-*c* may include determining a pathloss (e.g., path attenuation) between the first UE 115-*c* and the second UE 115-*d*. For example, the first UE 115-*c* may estimate a distance (e.g., relative position) between the first UE 115-*c* and the second UE 115-*d*, and may determine (e.g., estimate) a pathloss between the first UE 115-*c* and the second UE 115-*d* based on the estimated pathloss. In some aspects, the first UE 115-*c* may determine a pathloss between the first UE 115-*c* and the second UE 115-*d* for each sensing application at the first UE 115-*c*. For example, the first UE 115-*c* may be configured to perform a first sensing application using sensing signals associated with a first set of sensing parameters, and a second sensing application using sensing signals associated with a second set of sensing parameters. In this example, the first UE 115-*c* may determine a first pathloss associated with the first sensing application based on the relative position of the second UE 115-*d*, the first set of sensing signal parameters, or both. Similarly, the first UE 115-*c* may determine a second pathloss associated with the second sensing application based on the relative position of the second UE 115-*d*, the second set of sensing signal parameters, or both. In some aspects, the first UE 115-*c* may be configured to determine and/or refine estimated interference at the second UE 115-*d* based on the determined pathloss.

In some aspects, the first UE 115-*c* may include the relative position of the second UE 115-*d* in storage objects associated with various sensing applications supported by the first UE 115-*c*. For example, the first UE 115-*c* may include the relative position of the second UE 115-*d* in a first storage object associated with a first sensing application, and in a second storage object associated with a second sensing application. The storage objects may include any storage object known in the art including, but not limited to, a table, an index, a map, and the like. In some aspects, the first storage object and the second storage object may each additionally include other UEs 115 and respective other relative positions of the other UEs 115 with respect to the first UE 115-*c*. For example, the first storage object associated with the first sensing application may include a third UE 115 (not shown) and a relative position of the third UE 115 with respect to the first UE 115-*c*.

In some aspects, the first UE 115-*c* may be configured to estimate interference and/or ranges of potential interference associated with each respective sensing application based on the storage objects associated with each respective sensing application. For example, the first UE 115-*c* may determine, based on the first storage object associated with the first sensing application, that a UE 115 (e.g., the second UE 115-*d*) included within the first storage object is within a range of sensing signals associated with the first sensing application. By way of another example, the first UE 115-*c* may determine, based on the second storage object associated with the second sensing application, that a UE 115 (e.g., the second UE 115-*d*) included within the second storage object is within a range of sensing signals associated with the second sensing application.

In some cases, the first UE 115-*c* may selectively adjust parameters associated with the respective sensing applications (e.g., first sensing application, second sensing application) based on determining a UE 115 included in a respective storage objects is within range of the sensing signals associated with the respective sensing application. For example, as noted previously herein, the first UE 115-*c* may determine, based on the first storage object associated with the first sensing application, that a UE 115 (e.g., the second UE 115-*d*) included within the first storage object is within a range of sensing signals associated with the first sensing application. In this example, the first UE 115-*c* may selectively adjust a first set of sensing signal parameters associated with the first sensing application based on determining that a UE 115 included within the first storage object is within the range of sensing signals associated with the first sensing application. Sensing signal parameters which may be selectively adjusted may include, but are not limited to, a set of time resources for transmitting sensing signals, a set of frequency resources for transmitting sensing signals, a transmit power for transmitting sensing signals, a beam direction for transmitting sensing signals, and the like.

Additionally or alternatively, the first UE 115-c may selectively adjust parameters associated with the respective sensing applications (e.g., first sensing application, second sensing application) based on a quantity of UEs 115 which are within range of the sensing signals associated with a respective sensing application. For example, the first UE 115-c may determine, based on the first storage object associated with the first sensing application, a quantity of UEs 115 included within the first storage object which are within a range of sensing signals associated with the first sensing application. In this example, the first UE 115-c may selectively decrease a transmit power of the sensing signals associated with the first sensing application based on the quantity of UEs 115 which are within range and/or within the storage object exceeding a threshold. Conversely, the first UE 115-c may selectively increase a transmit power of the sensing signals associated with the first sensing application based on the quantity of UEs 115 which are within range and/or within the storage object being less than the threshold.

At 355, the first UE 115-c may transmit one or more sensing signals. In some cases, the first UE 115-c may transmit the one or more sensing signals to the second UE 115-d. In some aspects, the first UE 115-c may transmit the one or more sensing signals based on (e.g., in accordance with) respective sets of sensing signal parameters associated with respective sensing applications supported by the first UE 115-c. Sensing signal parameters may include a transmit power of sensing signals, a transmit direction (e.g., transmit beam) of sensing signals, and the like. In some aspects, the first UE 115-c may transmit the one or more sensing signals at 355 based on the configuration message received at 310, receiving the signals at 325, performing the measurements at 330, determining the beam direction at 355, determining the interference at the second UE 115-d at 340, performing the comparisons at 345, determining the relative position of the second UE 115-d at 350, or any combination thereof.

In some aspects, the first UE 115-c may transmit the one or more sensing signals based on (e.g., in accordance with) respective sets of sensing signal parameters associated with the respective sensing applications based on the comparing performed at 345. For example, the first UE 115-c may compare determined interference at the second UE 115-d with a threshold associated with a first sensing application at 345, and may transmit sensing signals associated with the first sensing application at 355 based on the comparison. Similarly, by way of another example, the first UE 115-c may compare determined interference at the second UE 115-d with a threshold associated with a second sensing application at 345, and may transmit sensing signals associated with the second sensing application at 355 based on the comparison.

Additionally or alternatively, the first UE 115-c may transmit the one or more sensing signals at 355 based on determining the beam direction at 335. For example, at 335, the first UE 115-c may determine that the signals transmitted by the second UE 115-d are associated with (e.g., were received along) a first beam direction. In this example, the first UE 115-c may transmit the one or more sensing signals at 355 along a second beam direction, where the second beam direction is similar and/or equivalent to the first beam direction. By transmitting the sensing signals along a similar (e.g., equivalent) beam direction as that by which the signals from the second UE 115-d were received, techniques described herein may enable more accurate determinations (e.g., estimations) of interference attributable to sensing signals, and may allow for more efficient management of sensing signal interference.

Techniques described herein may enable the first UE 115-c to estimate interference attributable to sensing signals transmitted by the first UE 115-c, and adjust parameters associated with the sensing signals to reduce interference attributable to the sensing signals. Accordingly, techniques described herein may facilitate the use of sensing applications while reducing interference attributable to the sensing applications, thereby improving the efficiency and reliability of wireless communications within a wireless communications system.

Figure 4:
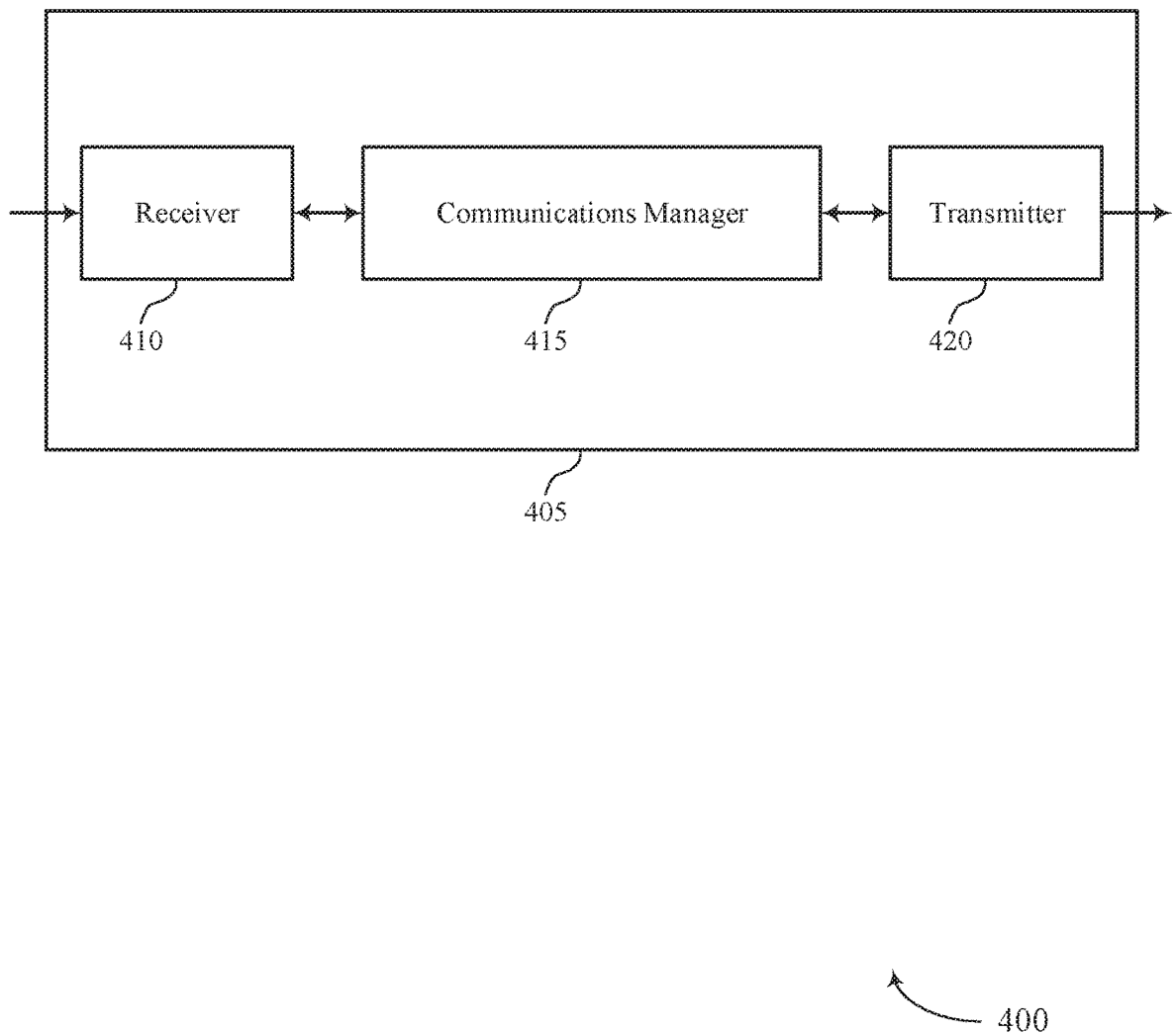
FIGS. 4 and 5 show block diagrams of devices that support techniques for self-awareness based interference measurement of sensing signals in accordance with aspects of the present disclosure.

FIG. 4 shows a block diagram 400 of a device 405 that supports techniques for self-awareness based interference measurement of sensing signals in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for self-awareness based interference measurement of sensing signals, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a set of interference measurement resources associated with signals received from a second UE, perform one or more measurements on one or more signals received from the second UE within the set of interference measurement resources, determine, based on the one or more measurements, interference at the second UE associated with sensing signals transmitted by the first UE, compare the interference at the second UE to one or more thresholds, each associated with a respective sensing application at the first UE, and transmit one or more sensing signals in accordance with respective sets of sensing signal parameters based on the comparing. The communications manager 415 may be an example of aspects of the communications manager 710 described herein.

The actions performed by the communications manager 415 as described herein may be implemented to realize one or more potential advantages. For example, signaling performed by a sensing UE 115 may enable the sensing UE 115 to determine interference experienced by a victim UE 115 which is attributable to sensing signals transmitted by the sensing UE 115. In this regard, techniques and signaling performed by the sensing UE 115 may enable the sensing UE 115 to adjust parameters of the sensing UE 115 in order to reduce interference attributable to sensing signals. Accordingly, enabling improved sensing signal interference management may facilitate use of sensing applications while reducing interference attributable to the sensing applications, which may lead to more efficient and reliable wireless communications.

By enabling improved sensing signal interference management, a processor of the sensing UE 115 (e.g., a processor controlling the receiver 410, the communications manager 415, the transmitter 420, etc.) may reduce processing resources used for wireless communications. For example, by improving sensing signal interference management, interference attributable to sensing signals may be reduced, thereby reducing a quantity of retransmissions which must be performed to communicate data within a wireless communications system. Reducing such interference and avoiding such retransmissions may correspondingly reducing a number of times the processor ramps up processing power and turns on processing units to handle uplink transmission and downlink reception.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
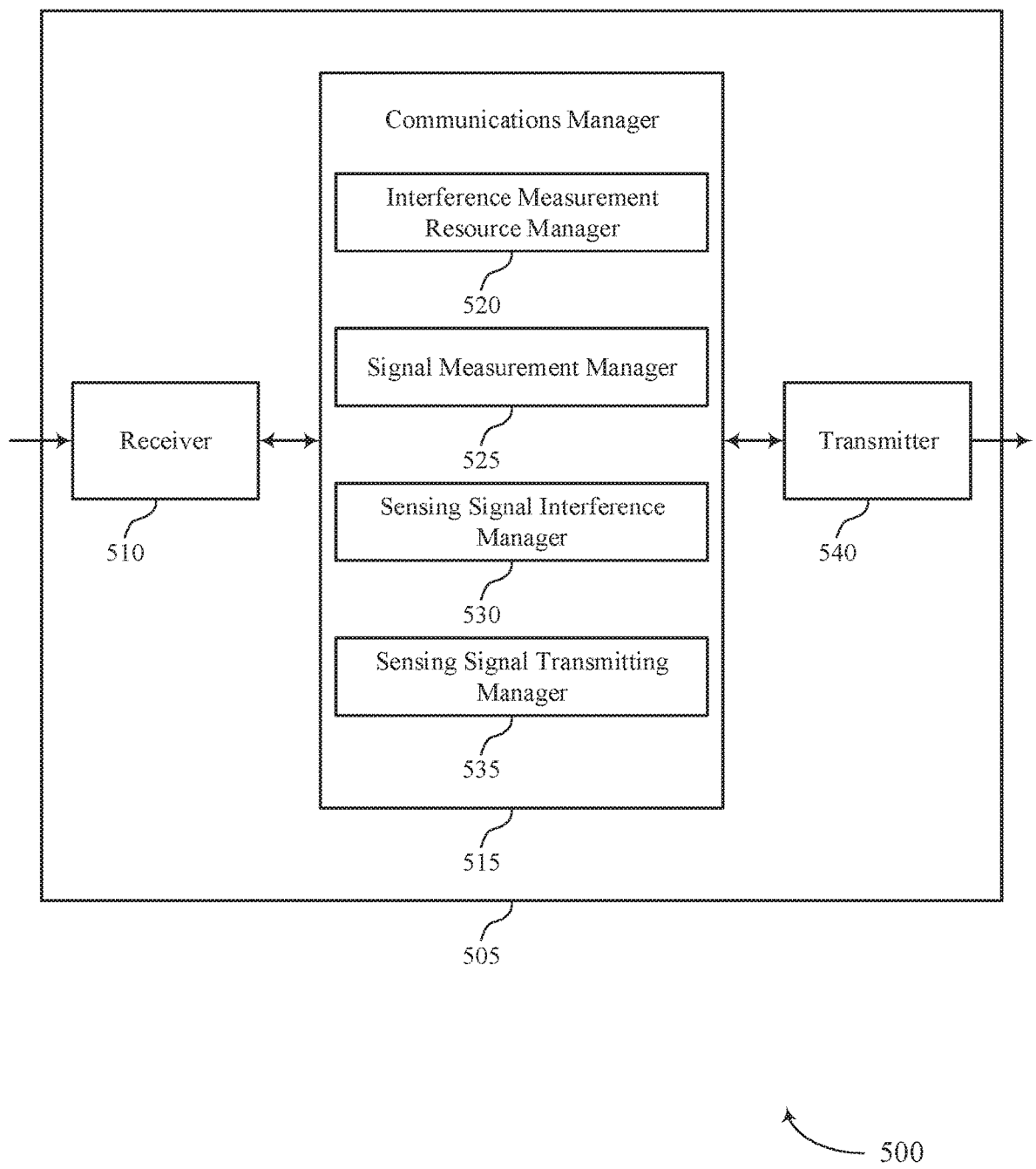

FIG. 5 shows a block diagram 500 of a device 505 that supports techniques for self-awareness based interference measurement of sensing signals in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to techniques for self-awareness based interference measurement of sensing signals, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an interference measurement resource manager 520, a signal measurement manager 525, a sensing signal interference manager 530, and a sensing signal transmitting manager 535. The communications manager 515 may be an example of aspects of the communications manager 710 described herein.

The interference measurement resource manager 520 may identify a set of interference measurement resources associated with signals received from a second UE.

The signal measurement manager 525 may perform one or more measurements on one or more signals received from the second UE within the set of interference measurement resources.

The sensing signal interference manager 530 may determine, based on the one or more measurements, interference at the second UE associated with sensing signals transmitted by the first UE and compare the interference at the second UE to one or more thresholds, each associated with a respective sensing application at the first UE.

The sensing signal transmitting manager 535 may transmit one or more sensing signals in accordance with respective sets of sensing signal parameters based on the comparing.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
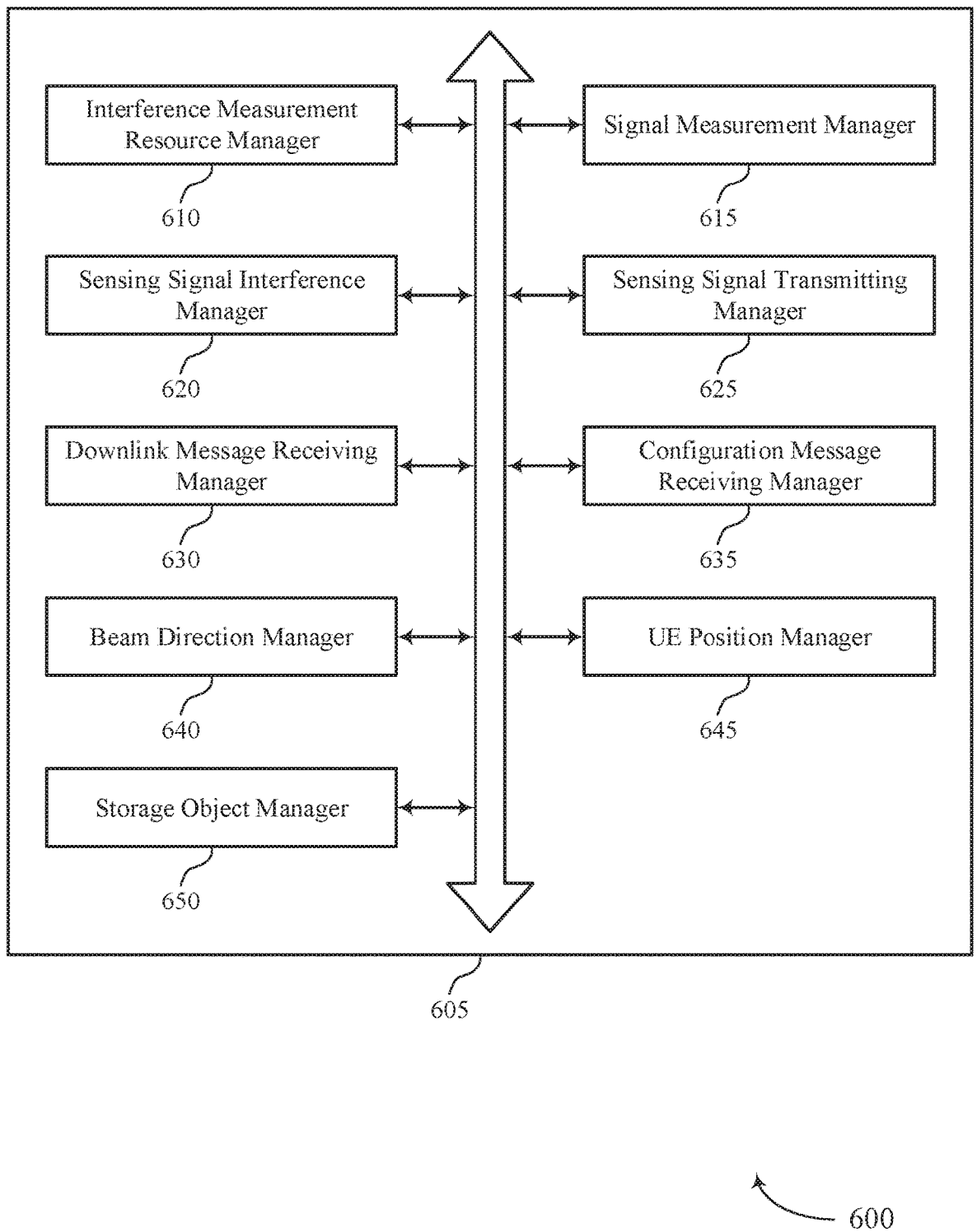
FIG. 6 shows a block diagram of a communications manager that supports techniques for self-awareness based interference measurement of sensing signals in accordance with aspects of the present disclosure.

FIG. 6 shows a block diagram 600 of a communications manager 605 that supports techniques for self-awareness based interference measurement of sensing signals in accordance with aspects of the present disclosure. The communications manager 605 may be an example of aspects of a communications manager 415, a communications manager 515, or a communications manager 710 described herein. The communications manager 605 may include an interference measurement resource manager 610, a signal measurement manager 615, a sensing signal interference manager 620, a sensing signal transmitting manager 625, a downlink message receiving manager 630, a configuration message receiving manager 635, a beam direction manager 640, a UE position manager 645, and a storage object manager 650. Each of these modules may communicate, directly or indirectly, with one another (e.g., via one or more buses).

The interference measurement resource manager 610 may identify a set of interference measurement resources associated with signals received from a second UE. In some examples, the interference measurement resource manager 610 may identify the set of interference measurement resources associated with signals received from the second UE based on the set of sensing resources associated with the one or more sensing signals transmitted by the first UE.

The signal measurement manager 615 may perform one or more measurements on one or more signals received from the second UE within the set of interference measurement resources. In some cases, the one or more signals received from the second UE include an uplink signal, a reference signal, or both. In some cases, the one or more measurements include an RSSI measurement, an RSRP measurement, or both.

The sensing signal interference manager 620 may determine, based on the one or more measurements, interference at the second UE associated with sensing signals transmitted by the first UE. In some examples, the sensing signal interference manager 620 may compare the interference at the second UE to one or more thresholds, each associated with a respective sensing application at the first UE.

The sensing signal transmitting manager 625 may transmit one or more sensing signals in accordance with respective sets of sensing signal parameters based on the comparing. In some examples, the sensing signal transmitting manager 625 may transmit the one or more sensing signals along a second beam direction based on determining the first beam direction, where the second beam direction is equivalent to the first beam direction. In some examples, the sensing signal transmitting manager 625 may selectively adjust a first set of sensing signal parameters associated with the first sensing application based on determining a UE included within the first storage object is within the range of the sensing signals associated with the first sensing application. In some examples, the sensing signal transmitting manager 625 may selectively decrease a transmit power of the first sensing application based on a quantity of UEs in the first storage object exceeding a threshold. In some examples, the sensing signal transmitting manager 625 may selectively increase a transmit power of the first sensing application based on the quantity of UEs in the first storage object being less than the threshold. In some cases, the first set of sensing signal parameters include a transmit power associated with the one or more sensing signals.

The downlink message receiving manager 630 may receive, from a base station, a downlink message including an indication of an average transmit power associated with the one or more signals received from the second UE, where determining the interference at the second UE is based on the average transmit power.

The configuration message receiving manager 635 may receive, from a base station, a configuration message including an indication of a set of sensing resources associated with the one or more sensing signals transmitted by the first UE, where transmitting the one or more sensing signals is based on receiving the configuration message.

The beam direction manager 640 may determine a first beam direction associated with the one or more signals received from the second UE.

The UE position manager 645 may determine a relative position of the second UE with respect to the first UE based on determining the interference at the second UE. In some examples, determining the relative position of the second UE with respect to the first UE includes determining a pathloss between the first UE and the second UE, where determining the interference at the second UE is based on determining the pathloss.

The storage object manager 650 may include the second UE and the relative position of the second UE in a first storage object associated with a first sensing application that also includes other UEs and respective other relative positions in relation to the first UE. In some examples, the storage object manager 650 may determine, based on the first storage object, that a UE included within the first storage object is within a range of the one or more sensing signals associated with the first sensing application. In some examples, the storage object manager 650 may include the second UE and the relative position of the second UE in a second storage object associated with a second sensing application different from the first sensing application, where the second storage object also includes other UEs and respective other relative positions in relation to the first UE.

Figure 7:
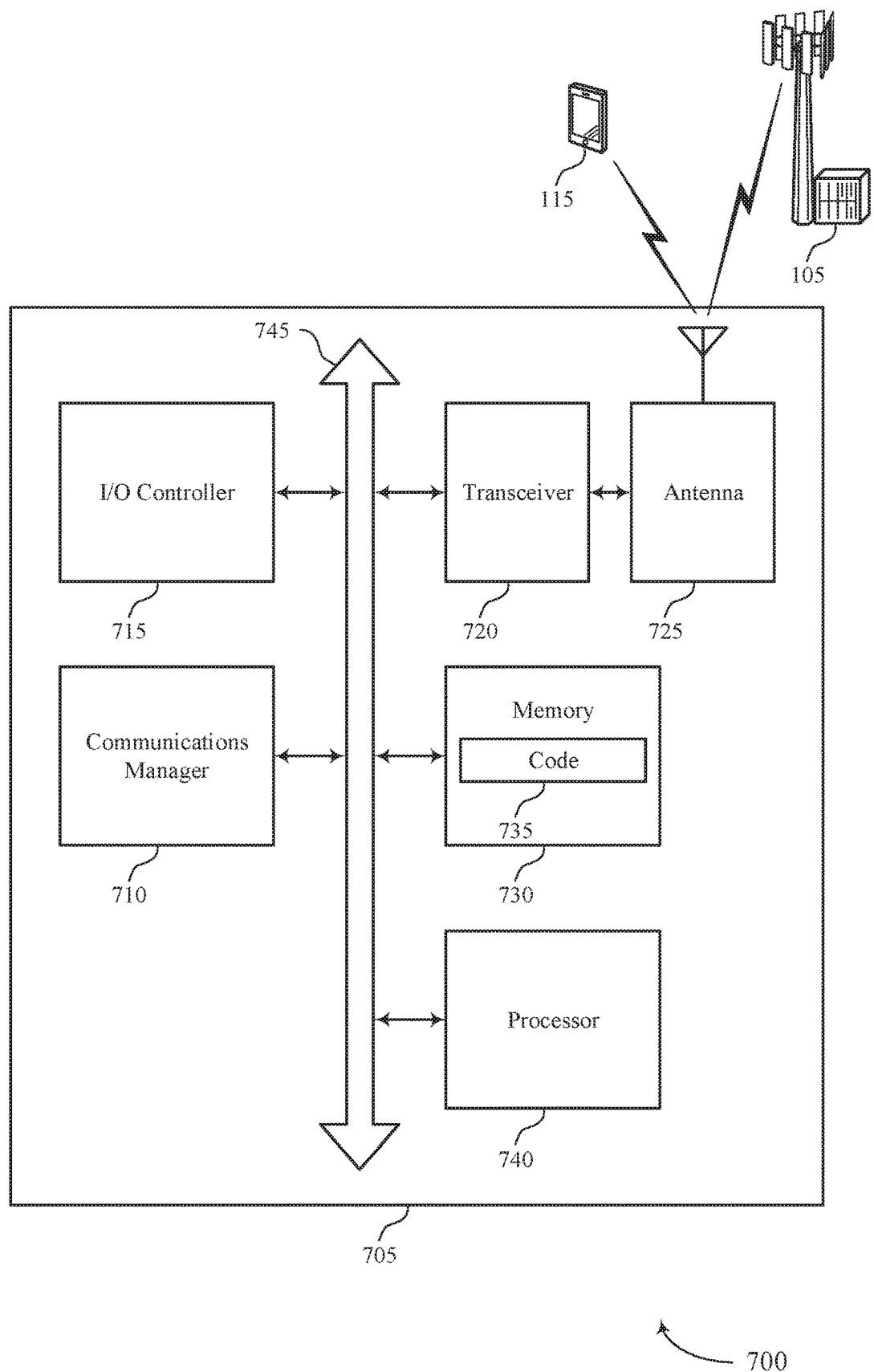
FIG. 7 shows a diagram of a system including a device that supports techniques for self-awareness based interference measurement of sensing signals in accordance with aspects of the present disclosure.

FIG. 7 shows a diagram of a system 700 including a device 705 that supports techniques for self-awareness based interference measurement of sensing signals in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a set of interference measurement resources associated with signals received from a second UE, perform one or more measurements on one or more signals received from the second UE within the set of interference measurement resources, determine, based on the one or more measurements, interference at the second UE associated with sensing signals transmitted by the first UE, compare the interference at the second UE to one or more thresholds, each associated with a respective sensing application at the first UE, and transmit one or more sensing signals in accordance with respective sets of sensing signal parameters based on the comparing.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for self-awareness based interference measurement of sensing signals).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
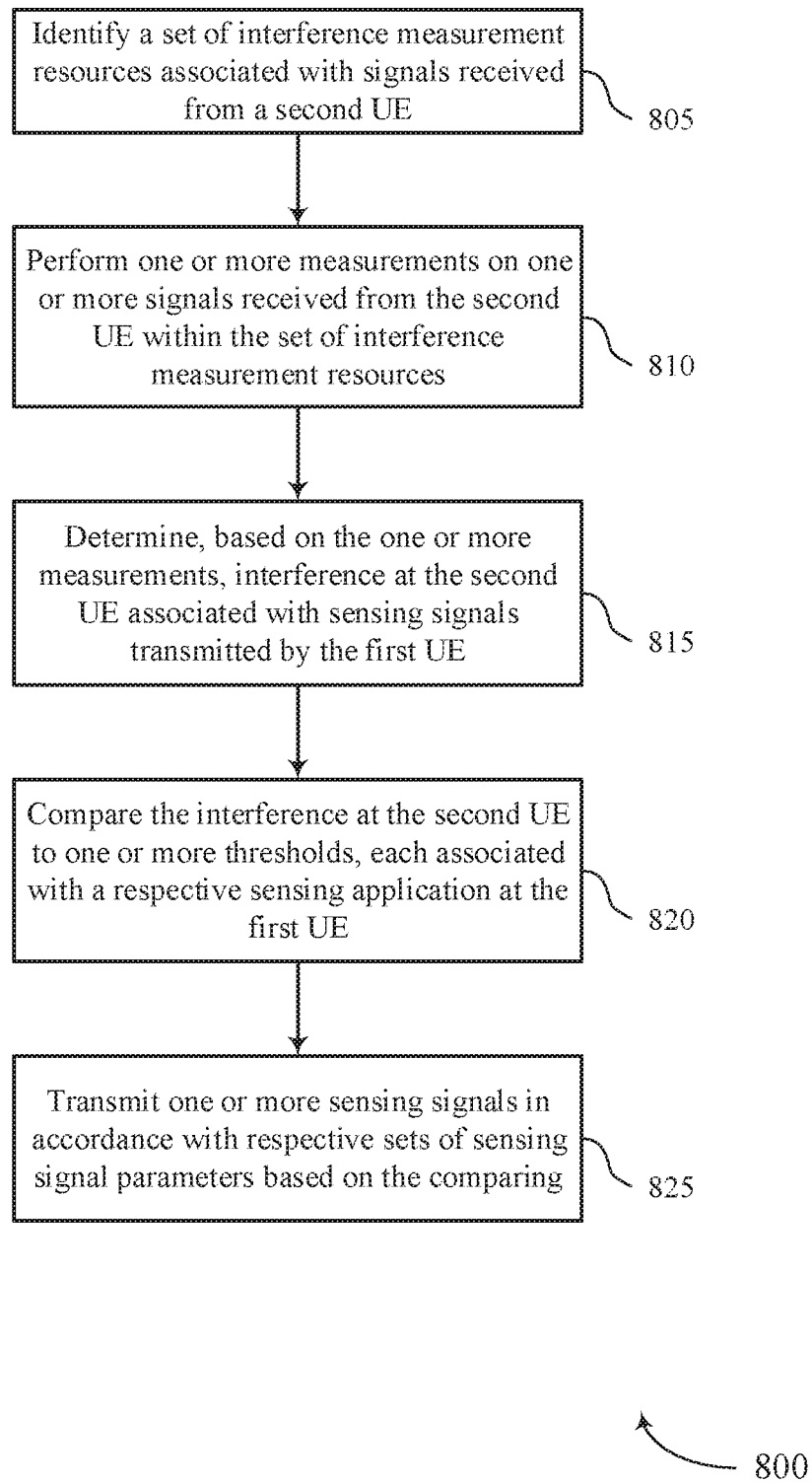
FIGS. 8 through 10 show flowcharts illustrating methods that support techniques for self-awareness based interference measurement of sensing signals in accordance with aspects of the present disclosure.

FIG. 8 shows a flowchart illustrating a method 800 that supports techniques for self-awareness based interference measurement of sensing signals in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may identify a set of interference measurement resources associated with signals received from a second UE. The operations of 805 may be performed according to the methods described herein. In some examples, aspects of the operations of 805 may be performed by an interference measurement resource manager as described with reference to FIGS. 4 through 7.

At 810, the UE may perform one or more measurements on one or more signals received from the second UE within the set of interference measurement resources. The operations of 810 may be performed according to the methods described herein. In some examples, aspects of the operations of 810 may be performed by a signal measurement manager as described with reference to FIGS. 4 through 7.

At 815, the UE may determine, based on the one or more measurements, interference at the second UE associated with sensing signals transmitted by the first UE. The operations of 815 may be performed according to the methods described herein. In some examples, aspects of the operations of 815 may be performed by a sensing signal interference manager as described with reference to FIGS. 4 through 7.

At 820, the UE may compare the interference at the second UE to one or more thresholds, each associated with a respective sensing application at the first UE. The operations of 820 may be performed according to the methods described herein. In some examples, aspects of the operations of 820 may be performed by a sensing signal interference manager as described with reference to FIGS. 4 through 7.

At 825, the UE may transmit one or more sensing signals in accordance with respective sets of sensing signal parameters based on the comparing. The operations of 825 may be performed according to the methods described herein. In some examples, aspects of the operations of 825 may be performed by a sensing signal transmitting manager as described with reference to FIGS. 4 through 7.

Figure 9:
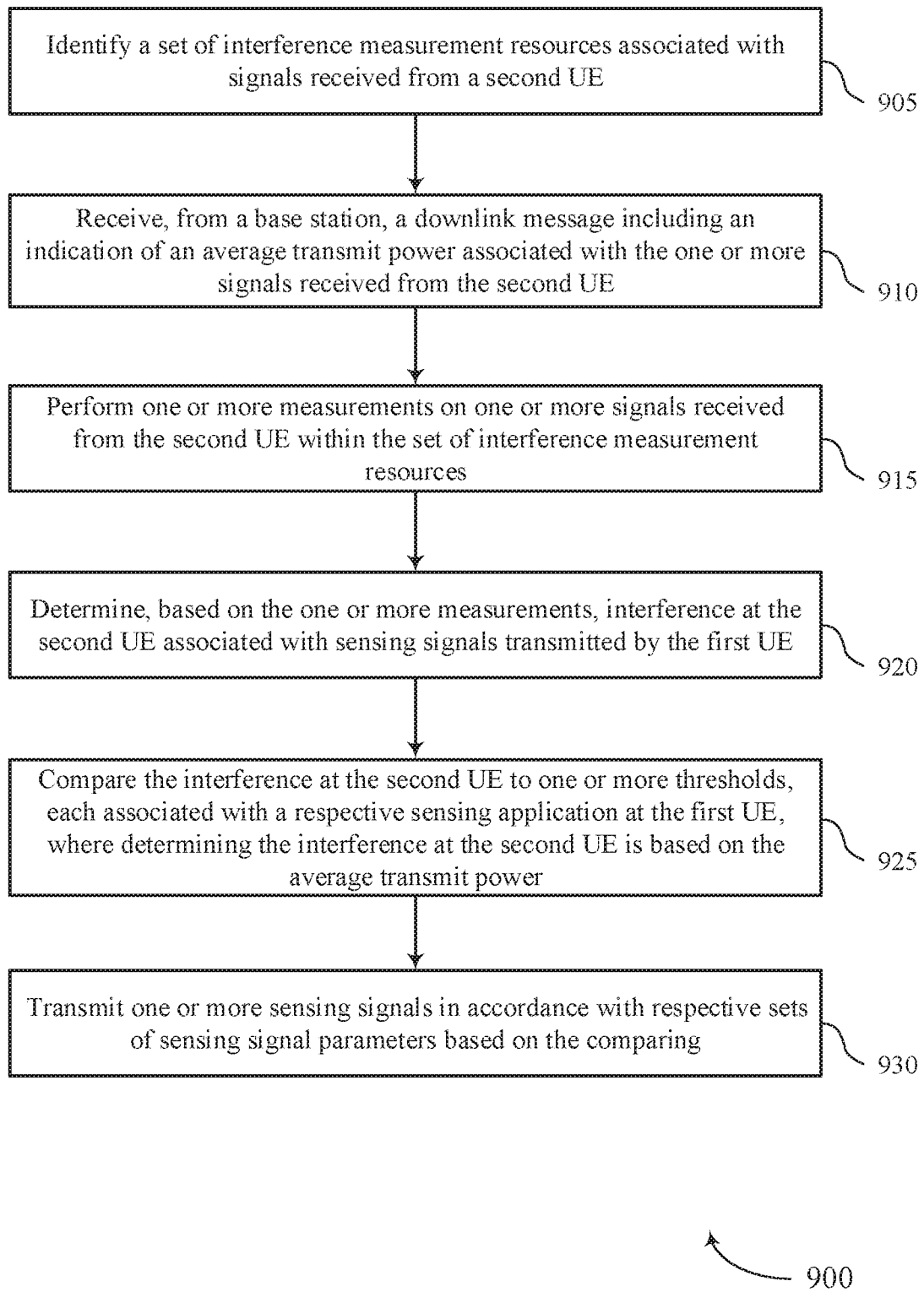

FIG. 9 shows a flowchart illustrating a method 900 that supports techniques for self-awareness based interference measurement of sensing signals in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may identify a set of interference measurement resources associated with signals received from a second UE. The operations of 905 may be performed according to the methods described herein. In some examples, aspects of the operations of 905 may be performed by an interference measurement resource manager as described with reference to FIGS. 4 through 7.

At 910, the UE may receive, from a base station, a downlink message including an indication of an average transmit power associated with the one or more signals received from the second UE. The operations of 910 may be performed according to the methods described herein. In some examples, aspects of the operations of 910 may be performed by a downlink message receiving manager as described with reference to FIGS. 4 through 7.

At 915, the UE may perform one or more measurements on one or more signals received from the second UE within the set of interference measurement resources. The operations of 915 may be performed according to the methods described herein. In some examples, aspects of the operations of 915 may be performed by a signal measurement manager as described with reference to FIGS. 4 through 7.

At 920, the UE may determine, based on the one or more measurements, interference at the second UE associated with sensing signals transmitted by the first UE. The operations of 920 may be performed according to the methods described herein. In some examples, aspects of the operations of 920 may be performed by a sensing signal interference manager as described with reference to FIGS. 4 through 7.

At 925, the UE may compare the interference at the second UE to one or more thresholds, each associated with a respective sensing application at the first UE, where determining the interference at the second UE is based on the average transmit power. The operations of 925 may be performed according to the methods described herein. In some examples, aspects of the operations of 925 may be performed by a sensing signal interference manager as described with reference to FIGS. 4 through 7.

At 930, the UE may transmit one or more sensing signals in accordance with respective sets of sensing signal parameters based on the comparing. The operations of 930 may be performed according to the methods described herein. In some examples, aspects of the operations of 930 may be performed by a sensing signal transmitting manager as described with reference to FIGS. 4 through 7.

Figure 10:
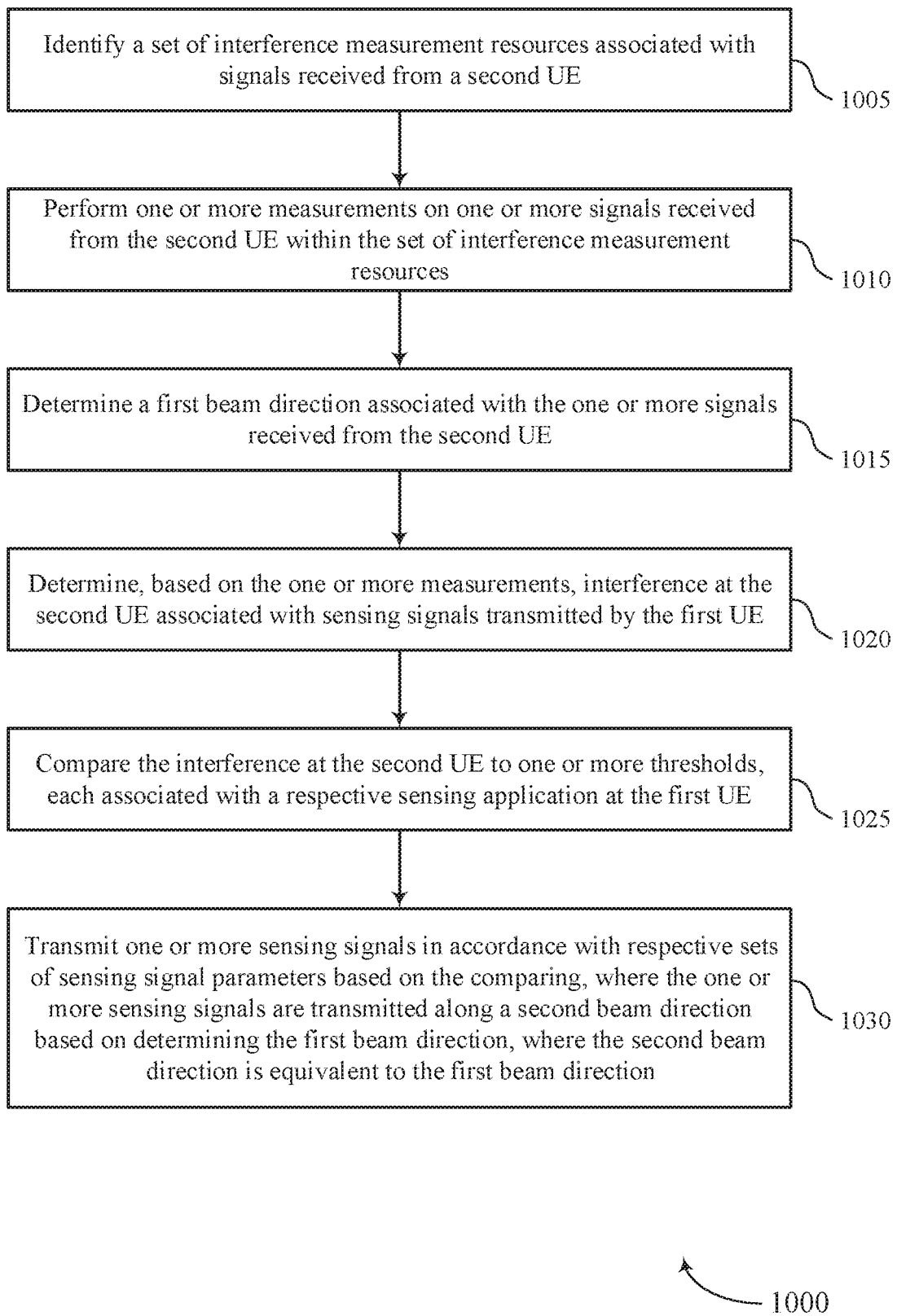

FIG. 10 shows a flowchart illustrating a method 1000 that supports techniques for self-awareness based interference measurement of sensing signals in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may identify a set of interference measurement resources associated with signals received from a second UE. The operations of 1005 may be performed according to the methods described herein. In some examples, aspects of the operations of 1005 may be performed by an interference measurement resource manager as described with reference to FIGS. 4 through 7.

At 1010, the UE may perform one or more measurements on one or more signals received from the second UE within the set of interference measurement resources. The operations of 1010 may be performed according to the methods described herein. In some examples, aspects of the operations of 1010 may be performed by a signal measurement manager as described with reference to FIGS. 4 through 7.

At 1015, the UE may determine a first beam direction associated with the one or more signals received from the second UE. The operations of 1015 may be performed according to the methods described herein. In some examples, aspects of the operations of 1015 may be performed by a beam direction manager as described with reference to FIGS. 4 through 7.

At 1020, the UE may determine, based on the one or more measurements, interference at the second UE associated with sensing signals transmitted by the first UE. The operations of 1020 may be performed according to the methods described herein. In some examples, aspects of the operations of 1020 may be performed by a sensing signal interference manager as described with reference to FIGS. 4 through 7.

At 1025, the UE may compare the interference at the second UE to one or more thresholds, each associated with a respective sensing application at the first UE. The operations of 1025 may be performed according to the methods described herein. In some examples, aspects of the operations of 1025 may be performed by a sensing signal interference manager as described with reference to FIGS. 4 through 7.

At 1030, the UE may transmit one or more sensing signals in accordance with respective sets of sensing signal parameters based on the comparing, where the one or more sing signals are transmitted along a second beam direction based on determining the first beam direction, where the second beam direction is equivalent to the first beam direction. The operations of 1030 may be performed according to the methods described herein. In some examples, aspects of the operations of 1030 may be performed by a sensing signal transmitting manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure.

Example 1: A method for wireless communication at a UE, including: identifying a set of interference measurement resources associated with signals received from a second UE; performing one or more measurements on one or more signals received from the second UE within the set of interference measurement resources; determining, based at least in part on the one or more measurements, interference at the second UE associated with sensing signals transmitted by the first UE; comparing the interference at the second UE to one or more thresholds, each associated with a respective sensing application at the first UE; and transmitting one or more sensing signals in accordance with respective sets of sensing signal parameters based at least in part on the comparing.

Example 2: The method of Example 1, further including: receiving, from a base station, a downlink message including an indication of an average transmit power associated with the one or more signals received from the second UE, where determining the interference at the second UE is based at least in part on the average transmit power.

Example 3: The method of any of Examples 1 through 2, further including: receiving, from a base station, a configuration message including an indication of a set of sensing resources associated with the one or more sensing signals transmitted by the first UE, where transmitting the one or more sensing signals is based at least in part on receiving the configuration message.

Example 4: The method of Example 3, further including: identifying the set of interference measurement resources associated with signals received from the second UE based at least in part on the set of sensing resources associated with the one or more sensing signals transmitted by the first UE.

Example 5: The method of any of Examples 1 through 4, further including: determining a first beam direction associated with the one or more signals received from the second UE; and transmitting the one or more sensing signals along a second beam direction based at least in part on determining the first beam direction, where the second beam direction is equivalent to the first beam direction.

Example 6: The method of any of Examples 1 through 5, further including: determining a relative position of the second UE with respect to the first UE based at least in part on determining the interference at the second UE.

Example 7: The method of Example 6, where determining the relative position of the second UE with respect to the first UE includes determining a pathloss between the first UE and the second UE, and where determining the interference at the second UE is based at least in part on determining the pathloss.

Example 8: The method of any of Examples 6 through 7, further including: including the second UE and the relative position of the second UE in a first storage object associated with a first sensing application that also includes other UEs and respective other relative positions in relation to the first UE.

Example 9: The method of Example 8, further including: determining, based on the first storage object, that a UE included within the first storage object is within a range of the one or more sensing signals associated with the first sensing application; and selectively adjusting a first set of sensing signal parameters associated with the first sensing application based at least in part on determining a UE included within the first storage object is within the range of the sensing signals associated with the first sensing application.

Example 10: The method of Example 9, further including: selectively decreasing a transmit power of the first sensing application based at least in part on a quantity of UEs in the first storage object exceeding a threshold; and selectively increasing a transmit power of the first sensing application based at least in part on the quantity of UEs in the first storage object being less than the threshold.

Example 11: The method of any of Examples 8 through 10, further including: including the second UE and the relative position of the second UE in a second storage object associated with a second sensing application different from the first sensing application, where the second storage object also includes other UEs and respective other relative positions in relation to the first UE.

Example 12: The method of any of Examples 1 through 11, where the one or more signals received from the second UE include an uplink signal, a reference signal, or both.

Example 13: The method of any of Examples 1 through 12, where the first set of sensing signal parameters include a transmit power associated with the one or more sensing signals.

Example 14: The method of any of Examples 1 through 13, where the one or more measurements include an RSSI measurement, an RSRP measurement, or both.

Example 15: An apparatus for wireless communication at a UE, including: a processor, memory coupled with the processor; and instructions stored in the memory and executable by the processor to cause the apparatus to: identify a set of interference measurement resources associated with signals received from a second UE; perform one or more measurements on one or more signals received from the second UE within the set of interference measurement resources; determine, based at least in part on the one or more measurements, interference at the second UE associated with sensing signals transmitted by the first UE; compare the interference at the second UE to one or more thresholds, each associated with a respective sensing application at the first UE; and transmit one or more sensing signals in accordance with respective sets of sensing signal parameters based at least in part on the comparing.

Example 16: The apparatus of Example 15, where the instructions are further executable by the processor to cause the apparatus to: receive, from a base station, a downlink message including an indication of an average transmit power associated with the one or more signals received from the second UE, where determining the interference at the second UE is based at least in part on the average transmit power.

Example 17: The method of any of Examples 15 through 16, where the instructions are further executable by the processor to cause the apparatus to: receive, from a base station, a configuration message including an indication of a set of sensing resources associated with the one or more sensing signals transmitted by the first UE, where transmitting the one or more sensing signals is based at least in part on receiving the configuration message.

Example 18: The method of Example 17, where the instructions are further executable by the processor to cause the apparatus to: identify the set of interference measurement resources associated with signals received from the second UE based at least in part on the set of sensing resources associated with the one or more sensing signals transmitted by the first UE.

Example 19: The method of any of Examples 15 through 19, where the instructions are further executable by the processor to cause the apparatus to: determine a first beam direction associated with the one or more signals received from the second UE; and transmit the one or more sensing signals along a second beam direction based at least in part on determining the first beam direction, where the second beam direction is equivalent to the first beam direction.

Example 19: The method of any of Examples 15 through 20, where the instructions are further executable by the processor to cause the apparatus to: determine a relative position of the second UE with respect to the first UE based at least in part on determining the interference at the second UE.

Example 21: The method of Example 20, where the instructions to determine the relative position of the second UE with respect to the first UE are executable by the processor to cause the apparatus to determine a pathloss between the first UE and the second UE, where determining the interference at the second UE is based at least in part on determining the pathloss.

Example 22: The method of any of Examples 20 through 21, where the instructions are further executable by the processor to cause the apparatus to: include the second UE and the relative position of the second UE in a first storage object associated with a first sensing application that also includes other UEs and respective other relative positions in relation to the first UE.

Example 23: The method of Example 23, where the instructions are further executable by the processor to cause the apparatus to: determine, based on the first storage object, that a UE included within the first storage object is within a range of the one or more sensing signals associated with the first sensing application; and selectively adjust a first set of sensing signal parameters associated with the first sensing application based at least in part on determining a UE included within the first storage object is within the range of the sensing signals associated with the first sensing application.

Example 24: The method of Example 23, where the instructions are further executable by the processor to cause the apparatus to: selectively decrease a transmit power of the first sensing application based at least in part on a quantity of UEs in the first storage object exceeding a threshold; and selectively increase a transmit power of the first sensing application based at least in part on the quantity of UEs in the first storage object being less than the threshold.

Example 25: The method of any of Examples 22 through 24, where the instructions are further executable by the processor to cause the apparatus to: include the second UE and the relative position of the second UE in a second storage object associated with a second sensing application different from the first sensing application, where the second storage object also includes other UEs and respective other relative positions in relation to the first UE.

Example 26: The method of any of Examples 15 through 25, where the one or more signals received from the second UE include an uplink signal, a reference signal, or both.

Example 27: The method of any of Examples 15 through 26, where the first set of sensing signal parameters include a transmit power associated with the one or more sensing signals.

Example 28: The method of any of Examples 15 through 26, where the one or more measurements include an RSSI measurement, an RSRP measurement, or both.

Example 29: An apparatus for wireless communication at a UE, including: means for identifying a set of interference measurement resources associated with signals received from a second UE; means for performing one or more measurements on one or more signals received from the second UE within the set of interference measurement resources; means for determining, based at least in part on the one or more measurements, interference at the second UE associated with sensing signals transmitted by the first UE; means for comparing the interference at the second UE to one or more thresholds, each associated with a respective sensing application at the first UE; and means for transmitting one or more sensing signals in accordance with respective sets of sensing signal parameters based at least in part on the comparing.

Example 30: The apparatus of Example 29, further including: means for receiving, from a base station, a downlink message including an indication of an average transmit power associated with the one or more signals received from the second UE, where determining the interference at the second UE is based at least in part on the average transmit power.

Example 31: The apparatus of any of Examples 29 through 30, further including: means for receiving, from a base station, a configuration message including an indication of a set of sensing resources associated with the one or more sensing signals transmitted by the first UE, where transmitting the one or more sensing signals is based at least in part on receiving the configuration message.

Example 32: The apparatus of Example 31, further including: means for identifying the set of interference measurement resources associated with signals received from the second UE based at least in part on the set of sensing resources associated with the one or more sensing signals transmitted by the first UE.

Example 33: The apparatus of any of Examples 29 through 32, further including: means for determining a first beam direction associated with the one or more signals received from the second UE; and means for transmitting the one or more sensing signals along a second beam direction based at least in part on determining the first beam direction, where the second beam direction is equivalent to the first beam direction.

Example 34: The apparatus of any of Examples 29 through 33, further including: means for determining a relative position of the second UE with respect to the first UE based at least in part on determining the interference at the second UE.

Example 35: The apparatus of Example 34, where the means for determining the relative position of the second UE with respect to the first UE includes means for determining a pathloss between the first UE and the second UE, where determining the interference at the second UE is based at least in part on determining the pathloss.

Example 36: The apparatus of any of Examples 34 through 35, further including: means for including the second UE and the relative position of the second UE in a first storage object associated with a first sensing application that also includes other UEs and respective other relative positions in relation to the first UE.

Example 37: The apparatus of Example 36, further including: means for determining, based on the first storage object, that a UE included within the first storage object is within a range of the one or more sensing signals associated with the first sensing application; and means for selectively adjusting a first set of sensing signal parameters associated with the first sensing application based at least in part on determining a UE included within the first storage object is within the range of the sensing signals associated with the first sensing application.

Example 38: The apparatus of Example 37, further including: means for selectively decreasing a transmit power of the first sensing application based at least in part on a quantity of UEs in the first storage object exceeding a threshold; and means for selectively increasing a transmit power of the first sensing application based at least in part on the quantity of UEs in the first storage object being less than the threshold.

Example 39: The apparatus of any of Examples 36 through 38, further including: means for including the second UE and the relative position of the second UE in a second storage object associated with a second sensing application different from the first sensing application, where the second storage object also includes other UEs and respective other relative positions in relation to the first UE.

Example 40: The apparatus of any of Examples 29 through 39, where the one or more signals received from the second UE include an uplink signal, a reference signal, or both.

Example 41: The apparatus of any of Examples 29 through 40, where the first set of sensing signal parameters include a transmit power associated with the one or more sensing signals.

Example 42: The apparatus of any of Examples 29 through 41, where the one or more measurements comprise an RSSI measurement, an RSRP measurement, or both.

Example 43: A non-transitory computer-readable medium storing code for wireless communication at a UE, the code comprising instructions executable by a processor to: identify a set of interference measurement resources associated with signals received from a second UE; perform one or more measurements on one or more signals received from the second UE within the set of interference measurement resources; determine, based at least in part on the one or more measurements, interference at the second UE associated with sensing signals transmitted by the first UE; compare the interference at the second UE to one or more thresholds, each associated with a respective sensing application at the first UE; and transmit one or more sensing signals in accordance with respective sets of sensing signal parameters based at least in part on the comparing.

Example 44: The non-transitory computer-readable medium of Example 43, where the instructions are further executable to: receive, from a base station, a downlink message including an indication of an average transmit power associated with the one or more signals received from the second UE, where determining the interference at the second UE is based at least in part on the average transmit power.

Example 45: The non-transitory computer-readable medium of any of Examples 43 through 44, where the instructions are further executable to: receive, from a base station, a configuration message including an indication of a set of sensing resources associated with the one or more sensing signals transmitted by the first UE, where transmitting the one or more sensing signals is based at least in part on receiving the configuration message.

Example 46: The non-transitory computer-readable medium of Example 45, where the instructions are further executable to: identify the set of interference measurement resources associated with signals received from the second UE based at least in part on the set of sensing resources associated with the one or more sensing signals transmitted by the first UE.

Example 47: The non-transitory computer-readable medium of any of Examples 43 through 46, where the instructions are further executable to: determine a first beam direction associated with the one or more signals received from the second UE; and transmit the one or more sensing signals along a second beam direction based at least in part on determining the first beam direction, where the second beam direction is equivalent to the first beam direction.

Example 48: The non-transitory computer-readable medium of any of Examples 43 through 47, where the instructions are further executable to: determine a relative position of the second UE with respect to the first UE based at least in part on determining the interference at the second UE.

Example 49: The non-transitory computer-readable medium of Example 48, where the instructions to determine the relative position of the second UE with respect to the first UE are executable by the processor to cause the apparatus to determine a pathloss between the first UE and the second UE, where determining the interference at the second UE is based at least in part on determining the pathloss.

Example 50: The non-transitory computer-readable medium of any of Examples 48 through 49, where the instructions are further executable to: include the second UE and the relative position of the second UE in a first storage object associated with a first sensing application that also includes other UEs and respective other relative positions in relation to the first UE.

Example 51: The non-transitory computer-readable medium of Example 50, where the instructions are further executable to: determine, based on the first storage object, that a UE included within the first storage object is within a range of the one or more sensing signals associated with the first sensing application; and selectively adjust a first set of sensing signal parameters associated with the first sensing application based at least in part on determining a UE included within the first storage object is within the range of the sensing signals associated with the first sensing application.

Example 52: The non-transitory computer-readable medium of Example 51, where the instructions are further executable to: selectively decrease a transmit power of the first sensing application based at least in part on a quantity of UEs in the first storage object exceeding a threshold; and selectively increase a transmit power of the first sensing application based at least in part on the quantity of UEs in the first storage object being less than the threshold.

Example 53: The non-transitory computer-readable medium of any of Examples 50 through 52, where the instructions are further executable to: include the second UE and the relative position of the second UE in a second storage object associated with a second sensing application different from the first sensing application, where the second storage object also includes other UEs and respective other relative positions in relation to the first UE.

Example 54: The non-transitory computer-readable medium of any of Examples 43 through 53, where the one or more signals received from the second UE include an uplink signal, a reference signal, or both.

Example 55: The non-transitory computer-readable medium of any of Examples 43 through 54, the first set of sensing signal parameters include a transmit power associated with the one or more sensing signals.

Example 56: The non-transitory computer-readable medium of any of Examples 43 through 55, the one or more measurements include an RSSI measurement, an RSRP measurement, or both.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   identifying a set of interference measurement resources associated with signals received from a second UE;
   performing one or more measurements on one or more signals received from the second UE within the set of interference measurement resources;
   determining, based at least in part on the one or more measurements, interference at the second UE associated with sensing signals transmitted by the first UE, wherein the sensing signals comprise a radar sensing signal, a millimeter wave (mmW) sensing signal, or a combination thereof;
   comparing the interference at the second UE to one or more thresholds, each associated with a respective sensing application at the first UE; and
   transmitting one or more sensing signals in accordance with respective sets of sensing signal parameters based at least in part on the comparing.

2. The method of claim 1, further comprising:
   receiving, from a base station, a downlink message comprising an indication of an average transmit power associated with the one or more signals received from the second UE, wherein determining the interference at the second UE is based at least in part on the average transmit power.

3. The method of claim 1, further comprising:
   receiving, from a base station, a configuration message comprising an indication of a set of sensing resources associated with the one or more sensing signals transmitted by the first UE, wherein transmitting the one or more sensing signals is based at least in part on receiving the configuration message.

4. The method of claim 3, further comprising:
   identifying the set of interference measurement resources associated with signals received from the second UE based at least in part on the set of sensing resources associated with the one or more sensing signals transmitted by the first UE.

5. The method of claim 1, further comprising:
   determining a first beam direction associated with the one or more signals received from the second UE; and
   transmitting the one or more sensing signals along a second beam direction based at least in part on determining the first beam direction, wherein the second beam direction is equivalent to the first beam direction.

6. The method of claim 1, further comprising:
   determining a relative position of the second UE with respect to the first UE based at least in part on determining the interference at the second UE.

7. The method of claim 6, wherein:
   determining the relative position of the second UE with respect to the first UE comprises determining a pathloss between the first UE and the second UE, wherein determining the interference at the second UE is based at least in part on determining the pathloss.

8. The method of claim 6, further comprising:
   including the second UE and the relative position of the second UE in a first storage object associated with a first sensing application that also includes other UEs and respective other relative positions in relation to the first UE.

9. The method of claim 8, further comprising:
   determining, based on the first storage object, that a UE included within the first storage object is within a range of the one or more sensing signals associated with the first sensing application; and
   selectively adjusting a first set of sensing signal parameters associated with the first sensing application based at least in part on determining a UE included within the first storage object is within the range of the sensing signals associated with the first sensing application.

10. The method of claim 9, further comprising:
    selectively decreasing a transmit power of the first sensing application based at least in part on a quantity of UEs in the first storage object exceeding a threshold; or
    selectively increasing a transmit power of the first sensing application based at least in part on the quantity of UEs in the first storage object being less than the threshold.

11. The method of claim 8, further comprising:
    including the second UE and the relative position of the second UE in a second storage object associated with a second sensing application different from the first sensing application, where the second storage object also includes other UEs and respective other relative positions in relation to the first UE.

12. The method of claim 1, wherein the one or more signals received from the second UE comprise an uplink signal, a reference signal, or both.

13. The method of claim 1, wherein the first set of sensing signal parameters comprise a transmit power associated with the one or more sensing signals.

14. The method of claim 1, wherein the one or more measurements comprise a received signal strength indicator (RSSI) measurement, a reference signal received power (RSRP) measurement, or both.

15. An apparatus for wireless communication at a first user equipment (UE), comprising:
a processor,
memory coupled with the processor; and
instructions stored in the memory and executable by the processor to cause the apparatus to:
identify a set of interference measurement resources associated with signals received from a second UE;
perform one or more measurements on one or more signals received from the second UE within the set of interference measurement resources;
determine, based at least in part on the one or more measurements, interference at the second UE associated with sensing signals transmitted by the first UE, wherein the sensing signals comprise a radar sensing signal, a millimeter wave (mmW) sensing signal, or a combination thereof;
compare the interference at the second UE to one or more thresholds, each associated with a respective sensing application at the first UE; and
transmit one or more sensing signals in accordance with respective sets of sensing signal parameters based at least in part on the comparing.

16. The apparatus of claim 15, wherein the instructions are further executable by the processor to cause the apparatus to:
receive, from a base station, a downlink message comprising an indication of an average transmit power associated with the one or more signals received from the second UE, wherein determining the interference at the second UE is based at least in part on the average transmit power.

17. The apparatus of claim 15, wherein the instructions are further executable by the processor to cause the apparatus to:
receive, from a base station, a configuration message comprising an indication of a set of sensing resources associated with the one or more sensing signals transmitted by the first UE, wherein transmitting the one or more sensing signals is based at least in part on receiving the configuration message.

18. The apparatus of claim 17, wherein the instructions are further executable by the processor to cause the apparatus to:
identify the set of interference measurement resources associated with signals received from the second UE based at least in part on the set of sensing resources associated with the one or more sensing signals transmitted by the first UE.

19. The apparatus of claim 15, wherein the instructions are further executable by the processor to cause the apparatus to:
determine a first beam direction associated with the one or more signals received from the second UE; and
transmit the one or more sensing signals along a second beam direction based at least in part on determining the first beam direction, wherein the second beam direction is equivalent to the first beam direction.

20. The apparatus of claim 15, wherein the instructions are further executable by the processor to cause the apparatus to:
determine a relative position of the second UE with respect to the first UE based at least in part on determining the interference at the second UE.

21. The apparatus of claim 20, wherein the instructions to determine the relative position of the second UE with respect to the first UE are executable by the processor to cause the apparatus to determine a pathloss between the first UE and the second UE, wherein determining the interference at the second UE is based at least in part on determining the pathloss.

22. The apparatus of claim 20, wherein the instructions are further executable by the processor to cause the apparatus to:
include the second UE and the relative position of the second UE in a first storage object associated with a first sensing application that also includes other UEs and respective other relative positions in relation to the first UE.

23. The apparatus of claim 22, wherein the instructions are further executable by the processor to cause the apparatus to:
determine, based on the first storage object, that a UE included within the first storage object is within a range of the one or more sensing signals associated with the first sensing application; and
selectively adjust a first set of sensing signal parameters associated with the first sensing application based at least in part on determining a UE included within the first storage object is within the range of the sensing signals associated with the first sensing application.

24. The apparatus of claim 23, wherein the instructions are further executable by the processor to cause the apparatus to:
selectively decrease a transmit power of the first sensing application based at least in part on a quantity of UEs in the first storage object exceeding a threshold; and
selectively increase a transmit power of the first sensing application based at least in part on the quantity of UEs in the first storage object being less than the threshold.

25. The apparatus of claim 22, wherein the instructions are further executable by the processor to cause the apparatus to:
include the second UE and the relative position of the second UE in a second storage object associated with a second sensing application different from the first sensing application, where the second storage object also includes other UEs and respective other relative positions in relation to the first UE.

26. The apparatus of claim 15, wherein the one or more signals received from the second UE comprise an uplink signal, a reference signal, or both.

27. The apparatus of claim 15, wherein the first set of sensing signal parameters comprise a transmit power associated with the one or more sensing signals.

28. The apparatus of claim 15, wherein the one or more measurements comprise a received signal strength indicator (RSSI) measurement, a reference signal received power (RSRP) measurement, or both.

29. An apparatus for wireless communication at a first user equipment (UE), comprising:
means for identifying a set of interference measurement resources associated with signals received from a second UE;
means for performing one or more measurements on one or more signals received from the second UE within the set of interference measurement resources;

means for determining, based at least in part on the one or more measurements, interference at the second UE associated with sensing signals transmitted by the first UE, wherein the sensing signals comprise a radar sensing signal, a millimeter wave (mmW) sensing signal, or a combination thereof;

means for comparing the interference at the second UE to one or more thresholds, each associated with a respective sensing application at the first UE; and means for transmitting one or more sensing signals in accordance with respective sets of sensing signal parameters based at least in part on the comparing.

30. The apparatus of claim 29, further comprising:
means for receiving, from a base station, a downlink message comprising an indication of an average transmit power associated with the one or more signals received from the second UE, wherein determining the interference at the second UE is based at least in part on the average transmit power.

31. The apparatus of claim 29, further comprising:
means for receiving, from a base station, a configuration message comprising an indication of a set of sensing resources associated with the one or more sensing signals transmitted by the first UE, wherein transmitting the one or more sensing signals is based at least in part on receiving the configuration message.

32. The apparatus of claim 31, further comprising:
means for identifying the set of interference measurement resources associated with signals received from the second UE based at least in part on the set of sensing resources associated with the one or more sensing signals transmitted by the first UE.

33. The apparatus of claim 29, further comprising:
means for determining a first beam direction associated with the one or more signals received from the second UE; and
means for transmitting the one or more sensing signals along a second beam direction based at least in part on determining the first beam direction, wherein the second beam direction is equivalent to the first beam direction.

34. The apparatus of claim 29, further comprising:
means for determining a relative position of the second UE with respect to the first UE based at least in part on determining the interference at the second UE.

35. The apparatus of claim 34, wherein the means for determining the relative position of the second UE with respect to the first UE comprises means for determining a pathloss between the first UE and the second UE, wherein determining the interference at the second UE is based at least in part on determining the pathloss.

36. The apparatus of claim 34, further comprising:
means for including the second UE and the relative position of the second UE in a first storage object associated with a first sensing application that also includes other UEs and respective other relative positions in relation to the first UE.

37. The apparatus of claim 36, further comprising:
means for determining, based on the first storage object, that a UE included within the first storage object is within a range of the one or more sensing signals associated with the first sensing application; and
means for selectively adjusting a first set of sensing signal parameters associated with the first sensing application based at least in part on determining a UE included within the first storage object is within the range of the sensing signals associated with the first sensing application.

38. The apparatus of claim 37, further comprising:
means for selectively decreasing a transmit power of the first sensing application based at least in part on a quantity of UEs in the first storage object exceeding a threshold; or
means for selectively increasing a transmit power of the first sensing application based at least in part on the quantity of UEs in the first storage object being less than the threshold.

39. The apparatus of claim 36, further comprising:
means for including the second UE and the relative position of the second UE in a second storage object associated with a second sensing application different from the first sensing application, where the second storage object also includes other UEs and respective other relative positions in relation to the first UE.

40. The apparatus of claim 29, wherein the one or more signals received from the second UE comprise an uplink signal, a reference signal, or both.

41. The apparatus of claim 29, wherein the first set of sensing signal parameters comprise a transmit power associated with the one or more sensing signals.

42. The apparatus of claim 29, wherein the one or more measurements comprise a received signal strength indicator (RSSI) measurement, a reference signal received power (RSRP) measurement, or both.

43. A non-transitory computer-readable medium storing code for wireless communication at a first user equipment (UE), the code comprising instructions executable by a processor to:
identify a set of interference measurement resources associated with signals received from a second UE;
perform one or more measurements on one or more signals received from the second UE within the set of interference measurement resources;
determine, based at least in part on the one or more measurements, interference at the second UE associated with sensing signals transmitted by the first UE, wherein the sensing signals comprise a radar sensing signal, a millimeter wave (mmW) sensing signal, or a combination thereof;
compare the interference at the second UE to one or more thresholds, each associated with a respective sensing application at the first UE; and
transmit one or more sensing signals in accordance with respective sets of sensing signal parameters based at least in part on the comparing.

44. The non-transitory computer-readable medium of claim 43, wherein the instructions are further executable to:
receive, from a base station, a downlink message comprising an indication of an average transmit power associated with the one or more signals received from the second UE, wherein determining the interference at the second UE is based at least in part on the average transmit power.

45. The non-transitory computer-readable medium of claim 43, wherein the instructions are further executable to:
receive, from a base station, a configuration message comprising an indication of a set of sensing resources associated with the one or more sensing signals transmitted by the first UE, wherein transmitting the one or more sensing signals is based at least in part on receiving the configuration message.

46. The non-transitory computer-readable medium of claim 45, wherein the instructions are further executable to:
identify the set of interference measurement resources associated with signals received from the second UE based at least in part on the set of sensing resources associated with the one or more sensing signals transmitted by the first UE.

47. The non-transitory computer-readable medium of claim 43, wherein the instructions are further executable to:
determine a first beam direction associated with the one or more signals received from the second UE; and
transmit the one or more sensing signals along a second beam direction based at least in part on determining the first beam direction, wherein the second beam direction is equivalent to the first beam direction.

48. The non-transitory computer-readable medium of claim 43, wherein the instructions are further executable to:
determine a relative position of the second UE with respect to the first UE based at least in part on determining the interference at the second UE.

49. The non-transitory computer-readable medium of claim 48, wherein, to determine the relative position of the second UE with respect to the first UE, the instructions are executable to determine a pathloss between the first UE and the second UE, wherein determining the interference at the second UE is based at least in part on determining the pathloss.

50. The non-transitory computer-readable medium of claim 48, wherein the instructions are further executable to:
include the second UE and the relative position of the second UE in a first storage object associated with a first sensing application that also includes other UEs and respective other relative positions in relation to the first UE.

51. The non-transitory computer-readable medium of claim 50, wherein the instructions are further executable to:
determine, based on the first storage object, that a UE included within the first storage object is within a range of the one or more sensing signals associated with the first sensing application; and
selectively adjust a first set of sensing signal parameters associated with the first sensing application based at least in part on determining a UE included within the first storage object is within the range of the sensing signals associated with the first sensing application.

52. The non-transitory computer-readable medium of claim 51, wherein the instructions are further executable to:
selectively decrease a transmit power of the first sensing application based at least in part on a quantity of UEs in the first storage object exceeding a threshold; and
selectively increase a transmit power of the first sensing application based at least in part on the quantity of UEs in the first storage object being less than the threshold.

53. The non-transitory computer-readable medium of claim 50, wherein the instructions are further executable to:
include the second UE and the relative position of the second UE in a second storage object associated with a second sensing application different from the first sensing application, where the second storage object also includes other UEs and respective other relative positions in relation to the first UE.

54. The non-transitory computer-readable medium of claim 43, wherein the one or more signals received from the second UE comprise an uplink signal, a reference signal, or both.

55. The non-transitory computer-readable medium of claim 43, wherein the first set of sensing signal parameters comprise a transmit power associated with the one or more sensing signals.

56. The non-transitory computer-readable medium of claim 43, wherein the one or more measurements comprise a received signal strength indicator (RSSI) measurement, a reference signal received power (RSRP) measurement, or both.

* * * * *